United States Patent [19]

Ueno et al.

[11] Patent Number: 5,301,331
[45] Date of Patent: Apr. 5, 1994

[54] INTERRUPTION HANDLING SYSTEM

[75] Inventors: Haruhiko Ueno, Kawasaki; Yozo Nakayama, Zama, both of Japan

[73] Assignee: Fujitsu Limited, Kawasaki, Japan

[21] Appl. No.: 776,347

[22] PCT Filed: Mar. 19, 1991

[86] PCT No.: PCT/JP91/00370

§ 371 Date: Nov. 19, 1991

§ 102(e) Date: Nov. 19, 1991

[87] PCT Pub. No.: WO91/14985

PCT Pub. Date: Oct. 3, 1991

[51] Int. Cl.[5] .............................. G06F 9/00
[52] U.S. Cl. .................... 395/725; 395/325; 364/DIG. 1
[58] Field of Search ............ 364/748, 941; 395/275, 395/325, 725

[56] References Cited

U.S. PATENT DOCUMENTS

| | | | |
|---|---|---|---|
| 4,385,365 | 5/1983 | Hashimoto et al. | 395/375 |
| 4,423,480 | 12/1983 | Bauer et al. | 395/325 |
| 4,456,970 | 6/1984 | Catiller et al. | 395/275 |
| 4,716,523 | 12/1987 | Burrus, Jr. et al. | 395/725 |
| 4,758,950 | 7/1988 | Cruess et al. | 395/725 |
| 4,761,732 | 8/1988 | Eldumiati et al. | 395/725 |
| 4,788,655 | 11/1988 | Nakayama et al. | 364/748 |
| 4,897,810 | 1/1990 | Nix | 364/941 |
| 4,959,782 | 9/1990 | Tulpule et al. | 395/725 |
| 5,155,809 | 10/1992 | Baker et al. | 395/325 |

FOREIGN PATENT DOCUMENTS 0184791  6/1986  European Pat. Off. ....... G06F 9/38

OTHER PUBLICATIONS

Bhandarkar et al., "Vector Extensions to the VAX Architecture", 35th IEEE Computer Society International Conference, Compcon Spring '90, Feb. 1990, San Francisco, pp. 120-126.
Iacobovici, S., "A Pipelined Interface for High Floating-point Performance with Precise Exceptions", *IEEE Micro*, vol. 8, No. 3, Jun. 1988, New York, pp. 77-87.
Van de Goor, A. J., "Computer Architecture and Design", Addison-Wesley Publishing Co., 1989, pp. 424-427.
Supplementary European Search Report, The Hague, Aug. 26, 1993.

*Primary Examiner*—Michael R. Fleming
*Assistant Examiner*—Tariq R. Hafiz
*Attorney, Agent, or Firm*—Staas & Halsey

[57] ABSTRACT

An interruption processing system enables a basic CPU resource using process to be executed asynchronously, enabling an interruption handler to be easily created. Interruption handling of the basic CPU resource using process interruption handler to be executed asynchronously enables corresponding interruption handler process is terminated for a CPU resource using process dependent interruption factor. The interruption processing system comprises a queuing unit for determining whether an instruction stored in an instruction buffer designates a synchronous process or an asynchronous process and for queuing the instruction when it is an asynchronous process. When more than one asynchronous process which has been queued is terminated unprocessed or with exceptions in the case where an interruption is generated in a synchronous processing unit or an asynchronous processing unit or an interruption from the outside of a CPU is detected, contents and termination methods of all asynchronous processes terminated unprocessed or with exceptions at the time of the generation of the interruption are displayed in order to resume the program prior to the generation of the interruption.

21 Claims, 14 Drawing Sheets

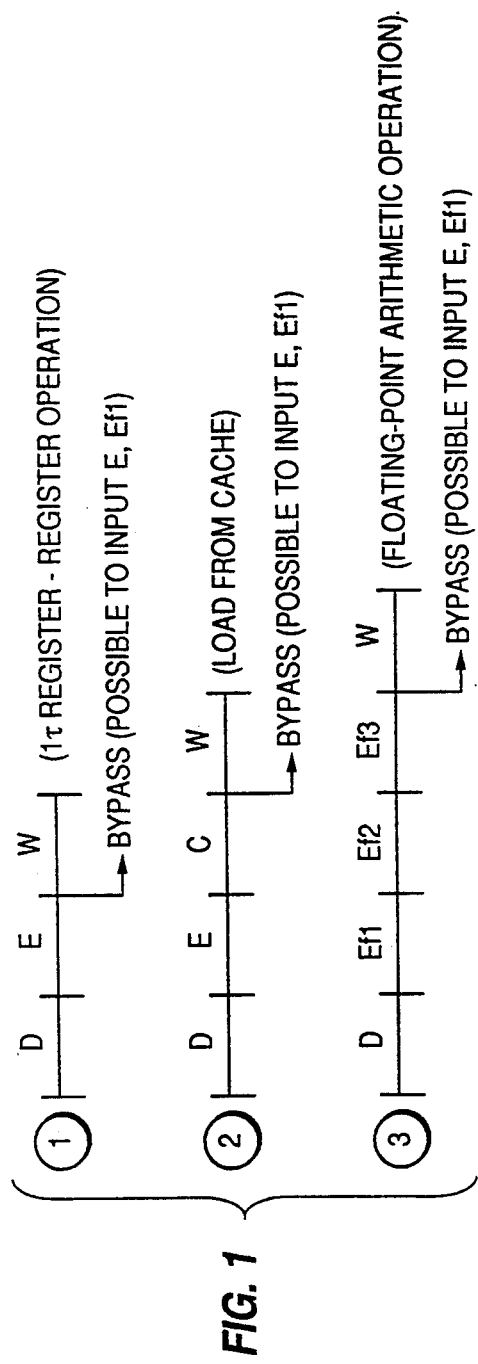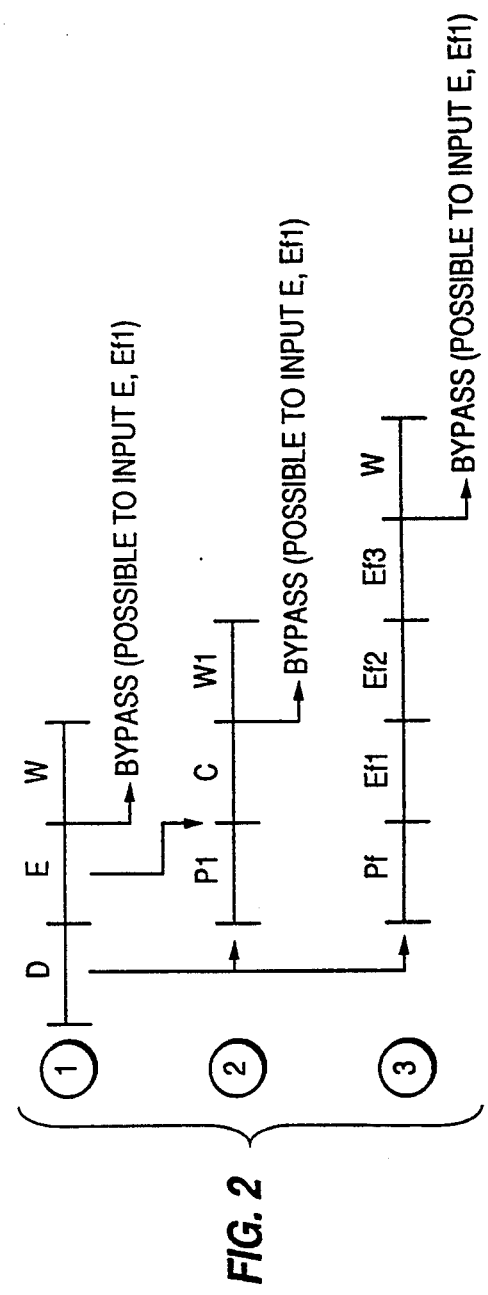
FIG. 1
FIG. 2

FIG. 3

```
D   Ewait Ewait  E    W
    ├──┤  ├──┤  ├──┤ ├──┤
       P1w   P1w  P1
             ├──┤ ├──┤ ├──┤ ├──┤
              P1   P1   C   W1
```

FIG. 4

| NUMBER | LABEL | INSTRUCTION | |
|---|---|---|---|
| 1 | | GR2 ← GR8 + OFFSET A[0] | /* GR8 MAINTAINS STARTING ADDRESS OF DATA AREA. OFFSET A[0] IS THE ONE FROM HEAD OF DATA AREA IN ARRAY A AND IS DESIGNATED IN IMM AREA */ |
| 2 | | GR3 ← 8 | |
| 3 | | GR4 ← GR2 + 800 | |
| 4 | | FR1 ← 0 | |
| 5 | LOOPTOP | FR2 ← MEMORY (GR2) | /* TO LOAD DATA FROM ADDRESS INDICATING GR2 TO FR2 */ |
| 6 | | FR1 ← FR1 + FR2 | /* FLOATING ADD */ |
| 7 | | GR2 ← GR2 + GR3 | |
| 8 | | COMPARE GR2, GR4 | |
| 9 | | BRANCH LESS THAN OR EQUAL TO, LOOPTOP | |
| 10 | PROGEND | | /* END OF PROGRAM */ |

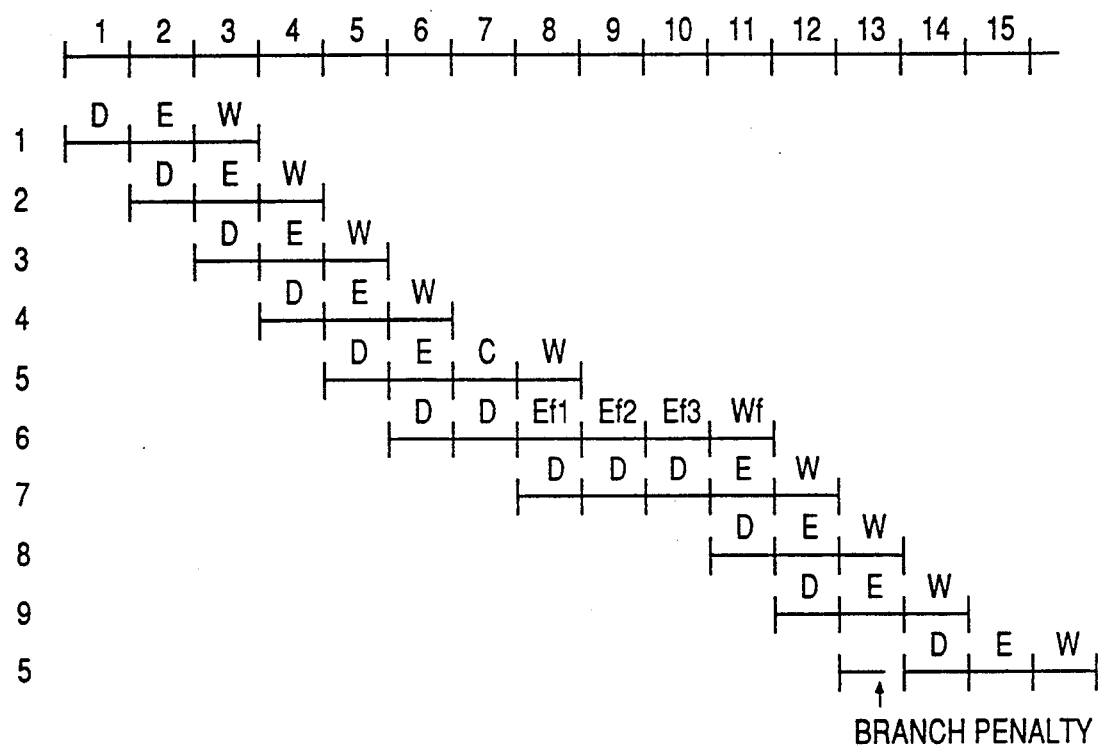

INTERRUPTION HANDLING SYSTEM

BACKGROUND OF THE INVENTION

1. Field of the Invention

The present invention relates to a method of terminating asynchronous CPU processes at the time of occurrence of an interruption and to a method of reporting CPU-resource-using process-dependent factors generated in the asynchronous CPU processes for use in a CPU which executes some CPU resource using processes with long processing times, asynchronously with instructions while guaranteeing data-dependent relationships of the processes. (Although a process is initiated by an instruction, the process is terminated after the instruction is terminated. After executing the instruction that initiated the process, the CPU initiates execution of a next instruction before termination of the initiated process.) The present invention is especially effective in executing basic processes used in an OS interruption handler asynchronously with instruction execution.

2. Description of the Related Art

In a CPU which executes a CPU-resource-using processes with a long processing time asynchronously with execution of an initiating instruction, partial prior execution of an instruction succeeding a preceding instruction which is long in processing time can be performed by partial prior execution of the succeeding instruction and canceling the effect of the preceding instruction when a program interruption is generated in the initiated by the preceding instruction process. In this case, however, the instruction pipeline of the CPU becomes complicated and the extent of prior execution of the succeeding instruction is limited.

An effective method of improving the CPU's performance without stopping the execution of a simultaneously executable succeeding CPU instruction (bearing no data-dependent relationship with the previous process) when the previous process requires a long processing time time in a CPU-resource, is to execute the CPU-resource-using process with a long processing time asynchronously with the execution of the succeeding instruction. Using this method, a plurality of, CPU-resource-using processes containing more than one asynchronous CPU-resource-using process will be executed at the same time.

In conventional computers, the following methods are used to terminate a CPU-resource-using process when an interruption occurs. There are two types of interruptions: CPU-resource-using process-dependent interruptions; and CPU-resource-using process-independent interruptions.

(1) All CPU-resource-using processes are executed synchronously with instructions. When a CPU-resource-using process-dependent interruption factor is detected as a result of an execution of an instruction, a corresponding CPU-resource-using process-dependent interruption is generated prior to the execution of the next instruction after the termination of the execution of the instruction. Only when no CPU-resource-using process-dependent interruption is detected at the execution of the last instruction and a CPU-resource-using process-independent factor is present, a corresponding CPU-resource using-process-independent interruption is generated.

In the situation where all the CPU-resource-using processes initiated prior to an interruption have been terminated at the time of the occurrence of the interruption, an interruption handler is easy to construct. In the case of an interruption for a necessary CPU-resource-using process-dependent factor, an original program can be resumed after proper processing by the interruption handler.

In the case of the previously described situation in a process (instruction) executing system, however, the execution of a succeeding CPU-resource-using process cannot be terminated during the execution of a CPU-resource using process with a long execution time, thus degrading the performance of the CPU.

(2) A unit (for example, a floating-point arithmetic unit) performs input/output operations on some of the CPU resources and asynchronously executes processes (asynchronous CPU-resource-using processes) which are initiated by instructions and executed asynchronously with the execution of the instructions. Where a CPU-resource-using-process-dependent factor is detected in these asynchronous CPU-resource using processes, when a process using a CPU resource accessed by the unit or an instruction initiating a process that the unit executes is executed, a CPU resource-using process-dependent interruption held by the asynchronous operation unit is generated synchronously with the instruction without executing a process specified by the instruction.

When an interruption corresponding to an interruption factor other than a CPU-resource-using-process-dependent interruption factor is detected by the asynchronous operation unit, termination of the operation of the asynchronous operation unit does not wait. The CPU-resource-using-process-dependent interruption factor held by the asynchronous operation unit at this point is not reported simultaneously.

When the asynchronous operation unit holds a CPU-resource-using-process-independent interruption factor and a CPU-resource-using-process-dependent interruption factor at the same time, the latter takes no precedence over the former and the CPU-resource-using-process-dependent interruption factor remains held, so that a CPU-resource-using-process-independent interruption is generated.

Where an asynchronous CPU-resource using process and its output resource are not used in an environment save area of the interruption handler, the method constitutes an effective interruption system. However, the interruption system will have the following problems in the case of non-synchronization of basic CPU-resource-using-processes used in the interruption handler.

After the occurrence of an interruption (first interruption), an interruption (second interruption) for a CPU-resource-using-process-dependent interruption factor is generated which is detected in a process initiated by a program executed prior to the occurrence of the first interruption during the operation of the interruption handler which processes the first interruption. In the process for the second interruption, it becomes difficult or impossible to determine which of programs initiated the process that generated the interruption factor. In this case, therefore, the processing of the CPU-resource-using-process-dependent interruption detected by a CPU-resource using process used by the interruption handler becomes impossible or the interruption processing by the interruption handler becomes very complicated.

(3) An asynchronously operating unit executes an asynchronous CPU-resource-using process initiated by an instruction and executed asynchronously with the instruction. To use the output of the asynchronous unit in a succeeding process, there are two cases: the case in which a specified procedure is required; and the case in which the initiation of execution of an instruction for initiating the succeeding process is delayed.

When some interruption factor is detected, the CPU performs the following interruption operations.

① It does not initiate the execution of a new instruction.

② It waits until all processes (asynchronous CPU-resource using processes) being executed by the asynchronously operating unit are terminated. The asynchronously operating unit executes all of the processes whose execution have been initiated regardless of whether or not a CPU-resource-using-process-dependent interruption factor has been detected in a preceding process. A CPU-resource-using-process-dependent interruption factor is detected and an output whose value differs from an expected value is also used as it is in a succeeding process. In this case, the result of execution of the succeeding process will become different from an expected one and a CPU-resource-using-process-dependent interruption factor may be detected even in the succeeding process because an input does not have an expected value.

When detecting more than one CPU-resource-using-process-dependent interruption factor as a result of operation ②, the asynchronous operation unit holds the interruption factor detected first or all the interruption factors detected.

In the case where all the detected interruption factors are held, when a certain CPU-resource-using-process-dependent interruption factor triggers off the generation of a CPU-resource-using-process-dependent interruption factor in a succeeding process, it becomes difficult to specify the triggering interruption factor.

③ When, in operation ②, none of the CPU-resource-using-process-dependent interruption factors are detected, the CPU-resource-using-process-dependent interruption that initiates the interruption operation is generated.

When a CPU-resource-using-process-dependent interruption factor is detected, a CPU-resource-using-process-dependent interruption is generated without depending on the type of the interruption factor that initiated the interruption operation.

With this interruption handling system, since a CPU-resource-using-process-dependent interruption factor is detected and the execution of a process using its output which has become an expected value as an input is not stopped, non-synchronization of a process results (such as for storage into main memory, an unpredictable area is destroyed when, an address used as an input is abnormal) that cannot specify a resource which is destroyed when an input is abnormal and makes debugging the program very difficult.

In addition, with this interruption system, when a CPU-resource-using-process-dependent interruption factor is detected in the non-synchronized process, the original program cannot be resumed.

Summary of Invention

A first object of the invention is to provide an interruption handling system which permits such basic CPU-resource using processes as are used by an interruption handler to be executed asynchronously and the interruption handler to be constructed easily.

A second object of the invention is to provide an interruption handling system which permits such basic CPU-resource using processes as are used by an interruption handler to be executed asynchronously and an original program to be resumed after termination of an interruption handler process corresponding to a necessary a CPU-resource-using-process-dependent interruption factor.

The above objects of the present invention are attained as follows.

① When a CPU-resource-using-process-dependent interruption factor or a CPU-resource-using-process-independent interruption factor is detected, an interruption operation is initiated.

② During the interruption operation, all or part of asynchronous CPU resource using processes are terminated while their data-dependent relationship is guaranteed. A process using the output of a process in which a CPU-resource using-process-dependent interruption factor has been detected as its input is terminated unexecuted. At the termination of the operation, the data-dependent relationship is erased.

③ When a CPU-resource-using-process-dependent interruption factor is detected at the termination of the process which included the interruption factor, a CPU-resource-using-process-dependent interruption is generated without depending on the type of the interruption factor which has initiated the interruption operation. Otherwise, a CPU-resource-using-process-independent interruption is generated.

At the time of generation of a CPU-resource-using-process-dependent interruption, all the CPU-resource-using-process-dependent interruption factors and information about processes unexecuted are displayed.

④ After proper processing of a CPU-resource-using-process-dependent interruption factor whose rerun is expected and a process terminated unexecuted by an interruption handler, hardware can rerun the process when return is made to the original program or the interruption handler displays information sufficient to simulate processing.

According to the present invention, (1) processes for performing inputting from CPU resources such as registers, outputting from CPU resources or both input and output are classified into two types of synchronous CPU resource using processes and asynchronous CPU resource using processes and are executed as follows.
① a synchronous CPU resource using process is initiated by an instruction instructing the process, and executed synchronously with the execution of the instruction. The synchronous CPU resource using process initiated by the instruction is completed at the termination of the execution of the instruction.

② An asynchronous CPU resource using process is initiated by an instruction instructing the process, and is executed asynchronously with the execution of the instruction. The asynchronous CPU resource using process initiated by the instruction is completed after the termination of the execution of the instruction;

(2) When an asynchronous CPU resource using process (preceding process) for performing an outputting operation to a CPU resource is initiated by an instruction and when an output to the resource used by the preceding process is used as input in a CPU resource using process (succeeding process) initiated by an instruction issued after the instruction which has initiated the preceding process, the input to the resource used by the succeeding process is waited until the output to the resource is terminated in the preceding process.

When the CPU resource using process (succeeding process) performs an output operation to a resource, the succeeding process performs an output operation to the resource after access to the resource by all of CPU resource using processes (preceding processes) initiated prior to the succeeding process.

When the succeeding process is a synchronous CPU resource using process, the termination of an instruction designating the succeeding process is delayed until access to a related resource in the prior process, that is, a program counter remains pointing to the instruction initiating the succeeding instruction. When the succeeding instruction is an asynchronous CPU resource using process, the termination of the execution of the instruction initiating the succeeding instruction may be delayed until access to the resource by the preceding process is terminated and access to the resource by the succeeding process may be delayed though the execution of the instruction initiating the succeeding instruction is completed and the succeeding process is initiated.

When the execution of the asynchronous CPU resource using process is initiated, the output to the resource used in the succeeding CPU resource using process waits until its input is completed, (3) Part of synchronous CPU resource using processes and part of asynchronous CPU resource using processes produce the generation of a CPU resource using process dependent interruption factor. The output of the process is an input in the succeeding process, for making the result of the execution of the succeeding process different from an expected execution result.

The CPU resource using process dependent interruption factor is detected when a specific event is generated while a CPU resource using process is being executed and shows that the output of the process in which the CPU resource using process interruption factor is detected is not the expected result, and that the interruption factor indicating that the use of the process output as an input in the succeeding process is not the expected result.

When the output of the process in which the CPU resource using process dependent interruption factor is used as an input in the succeeding process, the result of the execution of the succeeding process is also different from the expected execution result.

(4) When said CPU resource using process dependent interruption factor is detected in a CPU resource using process being executed or when an interruption factor of an interruption which is generated without directly depending on the result of the CPU resource using process being executed such as external interruption (CPU resource using process independent interruption), hardware performs the following interruption operations:

(A) though not initiating the execution of a new instruction, the hardware continues to execute the instruction being executed and the asynchronous CPU resource using process having its execution initiated, and waits for the executable CPU resource using process to terminate and for its state to vary no longer;

(B) after the wait for the termination of the CPU resource using process in step (A) is executed, all the asynchronous CPU resource using processes which were being executed at the time of the initiation of the interruption operation are terminated by one of the following methods.

Asynchronization ① Asynchronous CPU resource using process terminating means completes without detecting a CPU resource using process dependent interruption factor and the output of the process is the expected output.

Asynchronization ② Asynchronous CPU resource using process terminating means detects the CPU resource using process dependent interruption factor and terminates the execution.

Asynchronization ③ The asynchronous CPU resource using process terminating means is a process in which the asynchronous CPU resource using process uses the output to the resource of the preceding process, and the CPU resource using asynchronous process is terminated unprocessed when the preceding process detects a CPU resource using process dependent interruption factor and does not perform expected outputting, and the data-dependent relationship for the output of the process terminated unprocessed is erased.

Asynchronization ④ The asynchronous CPU resource using process terminating means terminates an asynchronous CPU resource using process using the output of the process unexecuted in asynchronization ③ or ④ as an input as it is unexecuted and the data-dependent relationship for the output of the process terminated unexecuted is erased.

Asynchronization ⑤ When at least one asynchronous CPU resource using process dependent interruption factor is detected, the asynchronous CPU resource using process terminating process may terminate an asynchronous CPU resource using process which has already been initiated by an instruction and has no data-dependent relationship with the interruption factor as it is unexecuted.

The synchronous CPU resources using process is completed at the time of terminating the execution of the instruction for starting the process by using one of the following methods. The synchronous CPU resource using process which is being executed is completed at the time of terminating the operation of (A) by using one of the following methods.

Synchronization ① The synchronous CPU terminating means completes without detecting a CPU resource using process dependent interruption factor.

Synchronization ② The synchronous CPU terminating means terminates the execution of a process by detecting a CPU resource using process dependent interruption factor.

(C) When none of CPU resource using process dependent interruption factors are detected, an interruption factor which has initiated an interruption operation is a CPU resource using process independent interruption factor and interruption generating means which generates an interruption corresponding to an interruption factor has initiated an interruption operation.

(D) When at least one CPU resource using process dependent interruption factor is detected, all information on CPU resource using asynchronous processes corresponding to the asynchronization ② to ④ and (B) and CPU resource using synchronous processes corresponding to the synchronization ② are notified to the program(s) initiating the processes simultaneously by one CPU resource using process dependent interruption without depending on an interruption factor which has initiated the interruption operation, thereby, performing a compound CPU resource using process dependent process.

(5) A part of CPU resource using process dependent interruption factors are the kinds of CPU resource using process dependent interruption factors which are generated by programs that are sometimes expected to resume after executing an appropriate process by the corresponding interruption factor processing program, e.g., a factor for a page absence. These factors are called a resume-expected CPU resource using process dependent interruption factor.

When a CPU resource using process dependent interruption is generated, if only a CPU resource using process dependent interruption factor expected to be resumed is dependent as an interruption factor, there is the possibility that the original program can be resumed after the proper processing of all generated CPU resource using process dependent interruptions which are expected to be resumed.

One of the following methods is possible for each of processes which generated resume-expected CPU resource using process dependent interruptions and for CPU resource using processes terminated unexecuted at the time of generation of a CPU resource using process dependent factor.

① A process detecting a designated resume-expected CPU resource using process dependent interruption factor and a process terminated unexecuted are re-executed when a CPU resource using process returns to the interruption-originating program.

② An interruption factor processing program displays information enough to simulate a process on a program at the time of an interruption, when a certain kind of CPU resource using process dependent interruption factor in which a program of the factor generating source is expected to resume and it is necessary to maintain the input data upon interruption, there is provided a resumption-expected CPU resource using process interruption process for terminating all the succeeding processes in which the input resource of the process generating the factor is determined as the output destination, when the interruption factor is generated, thereby enabling a program generating an interruption factor to be resumed when a resume-expected CPU resource using process dependent interruption factor is generated.

BRIEF DESCRIPTION OF DRAWINGS

FIG. 1 is a timing diagram of a conventional computer pipeline;

FIG. 2 is a timing diagram of a pipeline of a computer in which asynchronous CPU-resource processes which are the subject of the present invention are present;

FIG. 3 is a timing diagram indicating synchronization of an instruction execution controller and pipeline reading into main storage in FIG. 2;

FIG. 4 is a table illustrating an example of a program;

FIG. 5 is a timing diagram of the program of FIG. 4 in a conventional computer;

DESCRIPTION OF THE PREFERRED EMBODIMENTS

Figure 6:
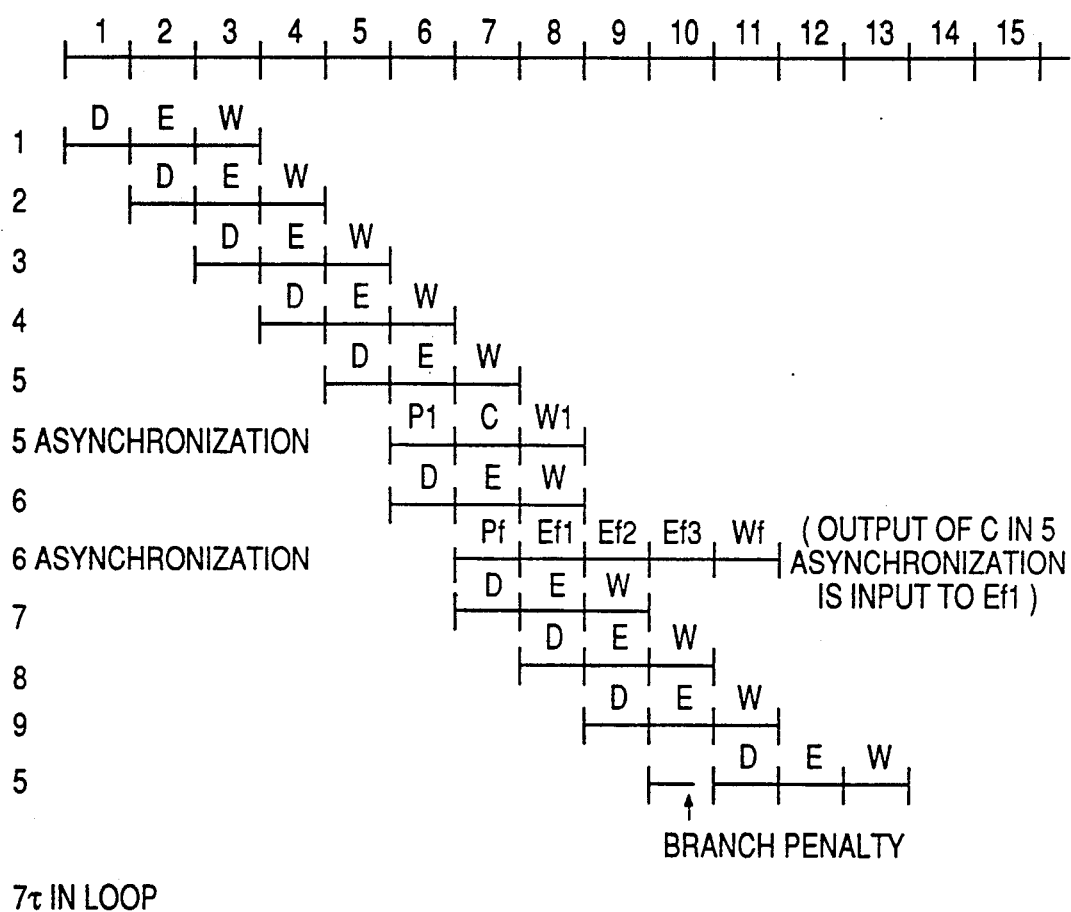
FIG. 6 is a timing diagram of the program of FIG. 4 in a computer of the present invention.

First, the throwing-away method for asynchronous processing of the present invention will be described in comparison with the case where it is not used. The basic timing in a pipeline system in which the throwing-away method is not used is shown in FIG. 1, while the timing of the case where the throwing-away method is shown in FIG. 2.

Each time interval has a duration of $1\tau$ and is used for synchronous timing. Symbols are used to explain operations allotted to the time intervals and the meaning of each symbol is indicated below.

D: Decode: Decoding of an instruction and an execute initiation condition (a collision of a data-dependent relationship and a resource)

E: Execute: Execution of an arithmetic operation, computation of an execute address in the case of a main storage access instruction W: Write: Writing of the result of execution Pl: Priority of load: Enqueuing into asynchronous processing queue and detecting of an execute initiation condition (a collision of a data-dependent relationship and a resource)

C: Cache: Address translation and reading of data from a cache

W1: Write of load: Writing of data read from the cache (and the main storage) into a register Pf: Priority of floating point operation: Enqueuing into an asynchronous execution queue and detecting of an execute initiation condition (a collision of a data-dependent relationship and a resource)

Ef1: Execute of floating point operation 1
Ef2: Execute of floating point operation 2
Ef3: Execute of floating point operation 3

Wf: Write cycle of the results of floating-point addition and floating-point multiplication.

In a pipeline using no throwing-away method, pipeline processing is performed in the order of D, E and W in an inter-register arithmetic operation as shown in FIG. 1 row ①. Bypassing is permitted at the end of the E cycle. When there is a need of loading from the cache, a C cycle for address translation and reading of data from the cache is needed. Bypassing is permitted at the end of this cycle.

In the case of a floating-point arithmetic operation, the execute cycle is prolonged from $1\tau$ to $3\tau$, which needs Ef1, Ef2 and Ef3. Bypassing is performed at the end of Ef3.

FIG. 2 shows the case where the throwing-away method is used as in the present invention. ①  is the same as the case where the throwing-away method is not used. In the case of loading from the cache, a P1 interval is present at the end of the D cycle as shown in ②. That is, after enqueuing into an asynchronous queue and detecting of an execute initiation condition (a collision of a data-dependent relationship and a resource), the C cycle follows. These operations can be performed by the throwing-away method. In the case of floating point as well, enqueuing into the asynchronous queue and detecting of an execute initiation condition (a collision of a data-dependent relationship and a resource) are performed by the throwing-away method. Subsequently, a floating-point operation cycle follows. In the throwing-away method, parallel operations are performed such that asynchronization operation is thrown away from or independent from the synchronization operation. Detailed timing of synchronization and non-synchronization is indicated in FIG. 3.

①: Pipeline of an instruction execute controller and a synchronous arithmetic operation executor D-Wait, E-wait and W-wait are present.

②: Asynchronous processing: Pipeline of reading (loading) into main storage (at the time of hit of the cache), the presence of P-wait, synchronization with the E cycle of the instruction execute controller until the C cycle is initiated (for the purpose of entering an effective address as the output of the E cycle in the C cycle).

A timing diagram for a program for obtaining the sum of arrays using basic timing in the cases where the throwing-away method is used and it is not used will be described using as an example, the program illustrated in FIG. 4.

The program of FIG. 4 is adapted to obtain the sum X of elements of an array A[0: 100]

$$X = A[0] + A[1] + \ldots + A[100]$$

It is assumed that the array elements are double-precision floating-point numbers (length of 8 bytes) in the form of IEEEP 754 (Project 754).

A description will be made of a timing chart when the program of FIG. 4 is executed in a synchronous computer which makes no use of the throwing-away of FIG. 5.

The instruction numbers 1 to 10 of the program correspond to the numbers indicated on the left of the timing chart.

Each of the instructions 1 to 4 is made possible by pipelining of synchronous processes D, E, W. At instruction number 5, the program enters looping and the cache is used at the first instruction within the loop, i.e., the fifth instruction. Thus, the basic cycle is formed of D, E, C, W. At the sixth instruction, addition of floating-point arithmetic is performed and its operand is the result of execution of the fourth instruction and the result of execution of the fifth instruction. If there is a data-dependent relationship and data is not gathered, the floating-point addition cannot be performed. Thus, the addition of GR 2 and GR 3 is performed in the instruction 7 which follows D, D, Ef1, Ef2, Ef3, Wf after a delay of 1τ as shown in the number 6 of the timing chart of FIG. 5. This makes no use of the result of the floating point instruction 6. In this example which has no data-dependent relationship with it and makes no use of the throwing-away method, the basic timing becomes D, D, D, E, W with the D cycle prolonged by 2τ as shown in the seventh instruction of FIG. 5.

Subsequently, the eighth Compare instruction and the ninth Branch instruction are performed in pipeline by D, E, W and, when a jump is made to the instruction 5 at the instruction 9, a delay of 1τ is produced as branch penalty to start D, E, W.

The timing chart of this operation using the throwing-away method of the computer of the present invention is shown in FIG. 6. The instruction numbers 1–4 are the same as those in FIG. 5. At that part of the instruction which uses the cache, the cache operation is performed asynchronously as shown by 5-asynchronization and the P1, C, W1 cycles are performed such that they are asynchronous. The C cycle of 5-asynchronization overlaps W of 5 and they are performed simultaneously. The execution is faster than the case of FIG. 5. In the floating-point arithmetic of the instruction 6, the execution is performed using the instructions 6 and 6-asynchronization and after decoding advance can be made to the 6-asynchronization state using the throwing-away method. As shown, the output of C of 5-asynchronization is used as the input of Ef1 of 6-asynchronization. In subsequent asynchronous processing of the instruction 7, its D cycle can be performed like the E cycle of the instruction 6, that is, the Pf cycle of 6-asynchronization.

Thus, in the case of FIG. 5 and 6, using the throwing-away method is faster than the case making no use of the method by 3τ.

The instructions 8, 9, 10 are the same as those in the previous case.

The resuming operation for asynchronous processing interruption of the present invention and the invention relating to data-dependent accounting are used in a computer using such a throwing-away method.

Next, a first embodiment of the present invention will be described with reference to FIG. 7.

First, each constituent element of FIG. 7 will be described.

Figure 8:
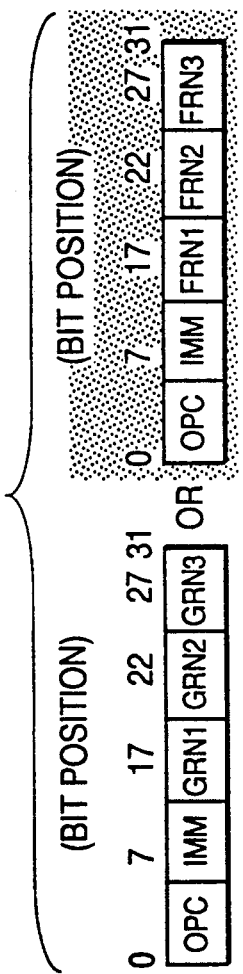
FIG. 8 is a diagram illustrating an instruction format.

As shown in FIG. 8, the instruction format is as follows.

OPC: Instruction code. The position parts of other fields of an instruction may be ignored, depending on the value of the OPC. It is assumed that whether the instruction bits 17 to 31 indicate GR or FR is determined by the value of the OPC as follows.

When the most significant bit of the OPC is a 0: the instruction bits 17 to 31 indicate GR.

When the most significant bit of the OPC is a 1: the instruction bits 17 to 31 indicate FR.

However, with an instruction for data transfer between main storage and FR, although the most significant bit of the OPC is a 0, it is assumed that the bits 17 to 26 indicate GRN1, GRN2 and the bits 27 to 31 indicate FR3. At this point, it is assumed that GR1+GR2+IMM indicate an effective address and FRN indicates transmission source or destination FR when the data is transmitted to or from the main storage.

IMM: Immediate data (input)
GRN1: GR Number 1, input GR register number 1
GRN2: GR Number 2, input GR register number 2
GRN3: GR Number 3, output GR register number 3
FRN1: FR Number 1, input FR register number 1
FRN2: FR Number 2, input FR register number 2
FRN3: FR Number 3, output FR register number The kinds of synchronous processing and asynchronous processing and the kinds of interruptions 2-1 synchronous processing
① Arithmetic processing of a short execution time
② Branching process, program calling process (process for modifying the instruction executing)
③ SVC (supervisor call) process
④ CR (control register) accessing process (excluding a process for modifying only CC in PSR)
⑤ Asynchronous processing queue copying register accessing process 2 - 2 Asynchronous processing
① Arithmetic process of a long execution time
② Transfer process between GR and main storage and transfer process between FR and main storage 2 - 3 Interruption
① Program interruption
Outputs of a CPU-resource-using-process-dependent interruption and a CPU-resource using process indicate values different from expected values.
② SVC (supervisor call) process
This is an interruption whose interruption factor is generated at the time of execution of an SVC instruction.
The low order seven bits of the IMM part of an SVC instruction $+0\times80$ are used as a call number.
③ External interruption
This is an interruption whose interruption factor is an external interruption signal which is externally input to the CPU. The external interruptions have levels 0 to 15. Only external interruption signals with levels above EAL of PSR are accepted to initiate interruption.

CPU Resources Accessed by Asynchronous Processing

In the case of asynchronous processing, access is made to only CR, FR and CC among CPU resources. Processes of accessing the CR and the asynchronous processing queue copying register comprise only synchronous processes.

Description of Each Hardware Unit

4 - 1 CPU resources
① GR (General purpose register)
This general purpose register is used as a base register or an index register for addressing destination of the input/output of an operation or main storage.
GR is 32 bits in length and 32 GRs are present. GR numbers 0 to 31 are uniquely allocated to the GRs. GR0 holds 0 at all times. The writing into the GR0 is ignored and a 0 is always read when the GR0 is read.
② FR (floating point register)
This is a register which is used for inputting/outputting floating-point arithmetic. An FR is 64 bits in length and 32 FRs are present. Unique FR numbers 0 to 31 are allocated to the FRs. The FR0 holds a 0 at all times. The writing into the FR0 is ignored. A 0 is always read when the FR0 is read.
③ CR (control register)
This is a register for holding parameters to control the operation of the CPU. 32 CRs each of 32 bits in length are present.
The CR0 to CR4 are allocated the following parameters.
CR0: PSR (Processor Status Register)
This register holds parameters (supervisor mode/user mode, etc.) for defining the main operating environment of a program. The PSR contains a CC (Condition Code: Condition Code Area) of 2 bits in length and an EAL (External Interrupt Accept Level) of 4 bits in length. The CC becomes a candidate for outputting in specific processing and is used as an input for branch determination in conditional branch processing.

The EAL defines the level of an accepted external interruption factor. Only external interruption signals having a value larger than the EAL are accepted to initiate interruption operation.

Figure 9:
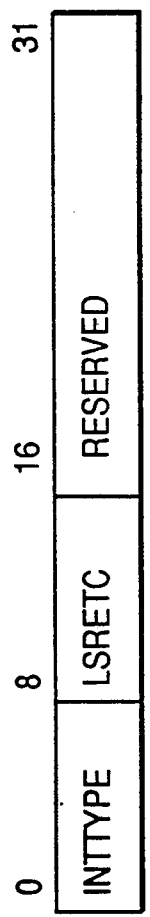
FIG. 9 is a diagram illustrating a termination code of a synchronous process.
Figure 10:
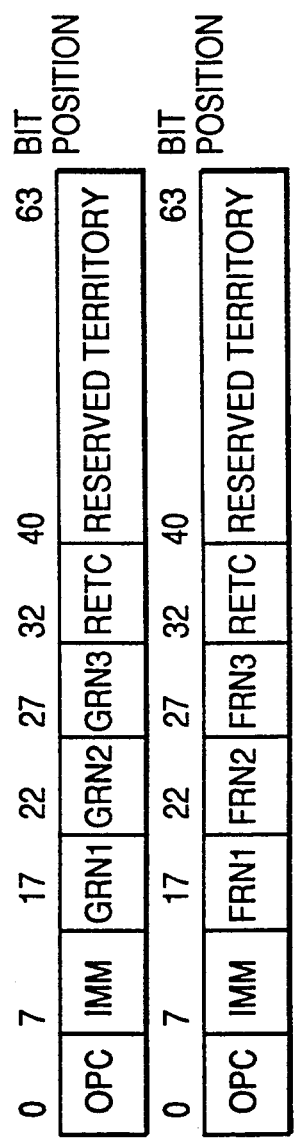
FIG. 10 is a diagram illustrating a form of an asynchronous queue copying register.

CR1: OPSR (Old PSR)
This is a register for holding the PSR value prior to the occurrence of an interruption at the time of the occurrence of the interruption.
CR2: OIC (Old Instruction Counter)
This is a register for holding the PC value (which points to the address of an instruction to be executed next) prior to the occurrence of an interruption at the time of the occurrence of the interruption.
CR3: OLEP (Old Last Entry Pointer)
This is a register for holding the last entry pointer value of a run queue of asynchronous processes after wait for the termination of the asynchronous processes.
CR4: INTD (INTerrupt Designation)
This is a register for holding a code (INTTYPE) indicating the type of an interruption at the occurrence of the interruption and a termination code (LSRETC) of an asynchronous process executed last at the occurrence of a program interruption in the form shown in FIG. 9.

For example, the following values are allocated to the INTTYPE.

$0\times00-0\times0F$: reserved
$0\times10$: program interruption
$0\times11-0\times1F$: reserved
$0\times20-0\times2F$: external interruptions of level 0 to level 15. (L+32) indicates an external interruption of level L.
$0\times30-0\times7F$: reserved
$0\times80-0\times FF$: supervisor calling interruptions with call numbers $0\times80-0\times FF$. The low-order 7 bits of the IMM value of a SVC instruction $+0\times80$ is a supervisor call number.

CR5: INTB (INterrupt Base address)
This is a register for holding the base address of an address newly set in an IC (Instruction Counter) at the time of the occurrence of an interruption. INTB+INTTYPE*16 is set as a new count of the IC at the time of the occurrence of an interruption.
CR6: NPSR (New PSR)
This is a register for holding a value newly set in the PSR at the time of the occurrence of an interruption.
CR7 to CR31:
These are used as registers for holding parameters defining other program operating environments.
④ Asynchronous Process Copy Register
This is a register onto which the contents of an asynchronous process queue after wait for the termination of an asynchronous operation is copied at the time of the occurrence of a program interruption. There are 32 asynchronous process copy registers each of which is 64 bits in length, but the APCR0 holds a 0 at all times. Each of the APCRs has the following form.

When the OLEP is not 0 at the time of the execution of an RTN (Return), the contents of the APCR1 to APCR(OLEP) are written into an asynchronous process queue.

4 -2 Instruction Buffer (IB)
This is the same as a usual CPU instruction buffer. An instruction to be executed is fed into this instruction buffer temporarily. Reading an instruction from main storage into the instruction buffer is performed in the same manner as in usual computers.

4 - 3 Instruction Execution Controller

This is a unit for controlling instruction execution and interruption. This performs the control of instruction fetch containing branches, decoding of instructions, processing execution control, control of interruption operations and interruption operations. For the operation of the instruction execution controller, refer to the description of the asynchronous process queue below.

The instruction execution controller includes the following registers.

① IC: Instruction Counter

This is a counter for indicating the address of an instruction to be executed next.

② SRETC: Synchronous process RETurn code

This is a register for holding the termination code of a synchronous process.

③ SVCC: SVC code

This is a register for holding the SVC code of an SVC instruction executed immediately before.

4 - 4 asynchronous process execution unit

This is a unit prompted by the instruction execution controller to execute a synchronous process. The SRETC (Synchronous process RETurn code) in the instruction executor control unit. is set in accordance with the result of the execution of the process.

4 - 5 Asynchronous process queue

This is a queue for holding an asynchronous process being executed and asynchronous processes initiated by instructions and waiting for execution. There are 31 entries APQE1 to APQE31. Each of the entries comprises an instruction code, a termination code (RETC: 8-bit length) and an execution ID (EXID). The entries ranging from APQE1 to APQE(SEP−1) are being executed.

APQE(SEP) is an entry to be executed next.

APQE(SEP+1) to APQE(LEP) are entries which are initiated by instructions but are placed in the execution wait state.

APQE(LEP+1) indicates an entry to be enqueued next.

There are the following register interference detection facilities for the instruction buffer and an entry pointed to by a starting-point. When, in the following register interference detection facility, the CR number in the instruction buffer is 0 or the GR number in the entry pointed to by the starting-point pointer is 0, it is determined that the area is not included in an area for comparison.

① Instruction Buffer (IB)

The facility for determining whether or not IB.GRN1 is included in the GRN3 area of APQE1 to APQE(LEP)

The facility for determining whether or not IB.GRN2 is included in the GRN3 area of APQE1 to APQE(LEP)

The facility for determining whether or not IB.GRN3 is included in the GRN1, GRN2 or GRN3 area of APQE1 to APQE(LEP)

In the case where the instructions in IB specifies FR, three similar determination facilities are provided.

The facility for determining whether or not a process (OPC) for modifying CC is included in APQE1 to APQE(LEP) when IB.OPC is a process for modifying or referring to CC. When IB.OPC is not a process for accessing CC, it is determined that there is no interference by CC.

When there is any one of these interferences, the data interference signal line to the instruction execution controller is a 1.

② Entry (Start Entry) pointed to by starting-point pointer

The facility for determining whether or not SE.GRN1 is included in the GRN3 area of APQE1 to APQE(LEP)

The facility for determining whether or not SE.GRN2 is included in the GRN3 area of APQE1 to APQE(LEP)

The facility for determining whether or not SE.GRN3 is included in the GRN1, GRN2 or GRN3 area of APQE1 to APQE(LEP)

In the case where the instruction in SE specifies FR, three similar determination facilities are provided.

The facility for determining whether or not a process (OPC) for modifying CC is included in APQE1 to APQE(SEP−1) when SE.OPC is a process for modifying CC. When SE.OPC is not a process for modifying CC, it is determined that there is no interference by CC.

Enqueuing into and dequeuing from the asynchronous process queue are performed by an enqueue and dequeue controller as follows.

① Enqueuing

When detecting that an instruction in the instruction buffer indicates asynchronous processing, the instruction execute controller issues a request for enqueuing of an asynchronous process to the enqueue and dequeue controller. When the LEP is less than 31, the enqueue and dequeue controller adds 1 to the LEP and copies the contents of the instruction buffer into an entry pointed to by the new value of the LEP. The RETC and EXID of the entry is initialized to 0.

When the LEP is 31, the asynchronous process queue is full and a new entry cannot be enqueued. In this case, the execution of an instruction is delayed until an entry has been dequeued from the queue.

② Dequeuing

When a process having an entry number smaller than the starting point pointer (SEP) is terminated without a program interruption factor, the asynchronous process execute controller specifies EXID to prompt the enqueue dequeue controller to dequeue the entry. The enqueue dequeue controller shifts each of entries following the entry having the specified EXID to its previous entry and decrements each of the SEP and LEP by one.

4 - 6 Enqueue dequeue controller

The enqueue dequeue controller is a unit which holds the starting entry pointer (SEP) and the last entry pointer (LEP) and performs the next operation.

① When prompted by the instruction execute controller, the enqueue dequeue controller enqueues the contents of the instruction buffer into the last location of the queue.

② After a wait for the termination of an asynchronous operation at the time of the occurrence of a program interruption factor, the controller is prompted by the instruction execute controller to copy the contents of APQE1 to APQE(LEP) into APCR1 to APCR(LEP) and the value of LEP into OLEP. Subsequently, a 0 is set in the LEP and a 1 is set in the SEP.

③ The EXID specified by the asynchronous process execute controller is written into an entry pointed to by the SEP and the SEP is incremented by one.

④ The entry having the EXID specified by the asynchronous process execute controller is dequeued.

⑤ A specified value is set in the RETC of an entry having the EXID specified by the asynchronous process execute controller.

4 - 7 Asynchronous process execute controller

The asynchronous process execute controller performs the determination of initiation of the entry pointed to by the SEP, the control of execute initiation of transmission of the instruction code and EXID to the process execute unit and processing thereof and the control at the time of termination of an asynchronous process. For the operation of the asynchronous process execute controller, refer to the descriptin ofhte asynchronous process queue below.

The asynchronous process execute controller includes the following two 31-bit length registers.

① EXIDB (EXID Busy flag)

This is a register consisting of 31 flags EXIDB#1 to EXIDB#31 each of one bit. The EXIDB#(X) indicates whether or not an asynchronous process having the X value as the EXID is used in the following manner.

0: EXID of the X value is not used.

1: The X value is used as the EXID. An asynchronous process having the X value as the EXID is either being executed or has been terminated as a result of detection of a program interruption factor.

② EXIDR(EXID interRupt flag)

This is a register consisting of 31 flags EXIDR#1 to EXIDR#31 each of one bit.

0: A process having the EXID of the X value is not present or being executed.

1: A process having the X value as the EXID has been terminated as a result of detection of a program interruption factor.

The asynchronous process execute controller is responsive to reception of the following signals from the instruction execute controller to perform a specific operation when it is a 1.

① Asynchronous process reset signal

Upon receipt of this signal, the asynchronous process execute controller performs the following operation at a specific time.

To set a 0 in the EXIDB.

To set a 0 in the EXIDB.

Also, the asynchronous process execute controller transmits the following two types of signals to the instruction execute controller.

② Asynchronous process program interruption signal

This is a signal which assumes a value of the logical sum of all bits of EXIDR#1 to EXIDR#31. Whether or not an asynchronous process is present which has been terminated as a result of the detection of a program interruption factor is indicated as follows.

0: There is no asynchronous process which has been terminated as a result of detection of a program interruption factor.

1: There is an asynchronous process which has been terminated as a result of detection of a program interruption factor.

③ Asynchronous process termination signal

This is a signal which becomes a 1 when there is no asynchronous process that is being executed and the asynchronous process execute controller is placed in the state in which a process in the asynchronous process queue is not initiated anew. This signal becomes a 1 in the following condition.

The LEP is a 0, or all the EXIDBs are not 0s and the EXIDBs are equal to the EXIDRs.

4 - 8 Asynchronous process execute units

These are units which are prompted by the asynchronous process execute controller to execute specific asynchronous processes. The units perform the following operations.

① To initiate a process in response to receipt of an instruction code and EXID from the asynchronous process execute controller.

② To inform the asynchronous process execute controller of the EXID and RETC at the time of termination of the process.

Next, the instruction executing operation according to the first embodiment will be described using FIGS. 11A and 11B.

First, starting with [A] in the figure, four bytes are read from the address designated by IC into the instruction buffer. Next, a determination is made as to whether or not a program interruption factor relating to instruction reading has been generated. If YES, the value corresponding to the generated program interruption factor is output as the SRETC. If NO, a shift is made to [B] when there is no interruption operation initiation factor. The interruption operation initiation factor is that ① the SRETC is not a 0, ② the asynchronous process program interruption signal is a 1, ③ the SVCC is not a 0, ④ there is an external interruption signal having a greater level than the EAL.

When there is an interruption operation initiation factor, a determination is made as to whether or not the OPC in the instruction buffer specifies an asynchronous process. If YES, a process in which the OPC in the instruction buffer is not defined is specified.

If this specification is NO, a determination is made as to whether there is a data-dependent relationship between previous entries on the basis of the instruction in the instruction buffer and the LEP in the asynchronous process queue. If NO, the synchronous execute unit is prompted to execute processing, the synchronous execute unit outputs the result of execution as the SRETC at the time of termination of processing, the SVCC is set in the SVC process, 4 is added to the IC when the executed process is not a process for modifying the IC and a determination is made as to whether or not the SRETC is a 0 (there is a program interruption factor in an asynchronous process).

Figure 11A:
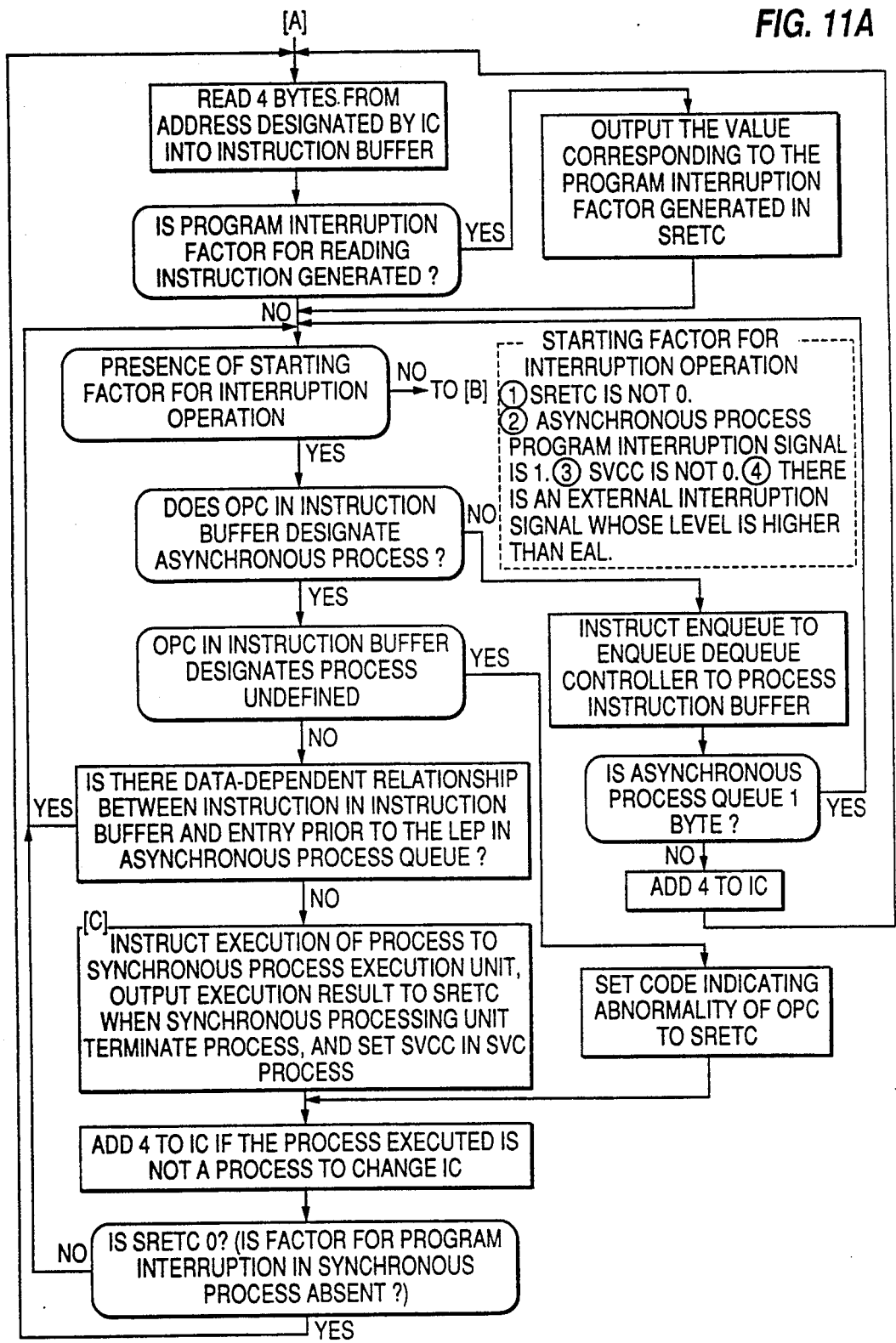
FIGS. 11A and 11B are a flowchart illustrating the operation of the instruction execution controller in the first embodiment.

If YES, a return is made to the first step in FIG. 11A. When the OPC in the instruction buffer specifies an undefined process, a code indicating abnormality of the OPC is set in the SRETC.

When the OPC in the instruction buffer does not specify non-synchronization, the enqueue dequeue controller is prompted to enqueue a process in the instruction buffer and a determination is made as to whether or not the asynchronous process queue is one byte. If NO, 4 is added to the IC and then a return is made to the first step in FIG. 11A.

Figure 11B:
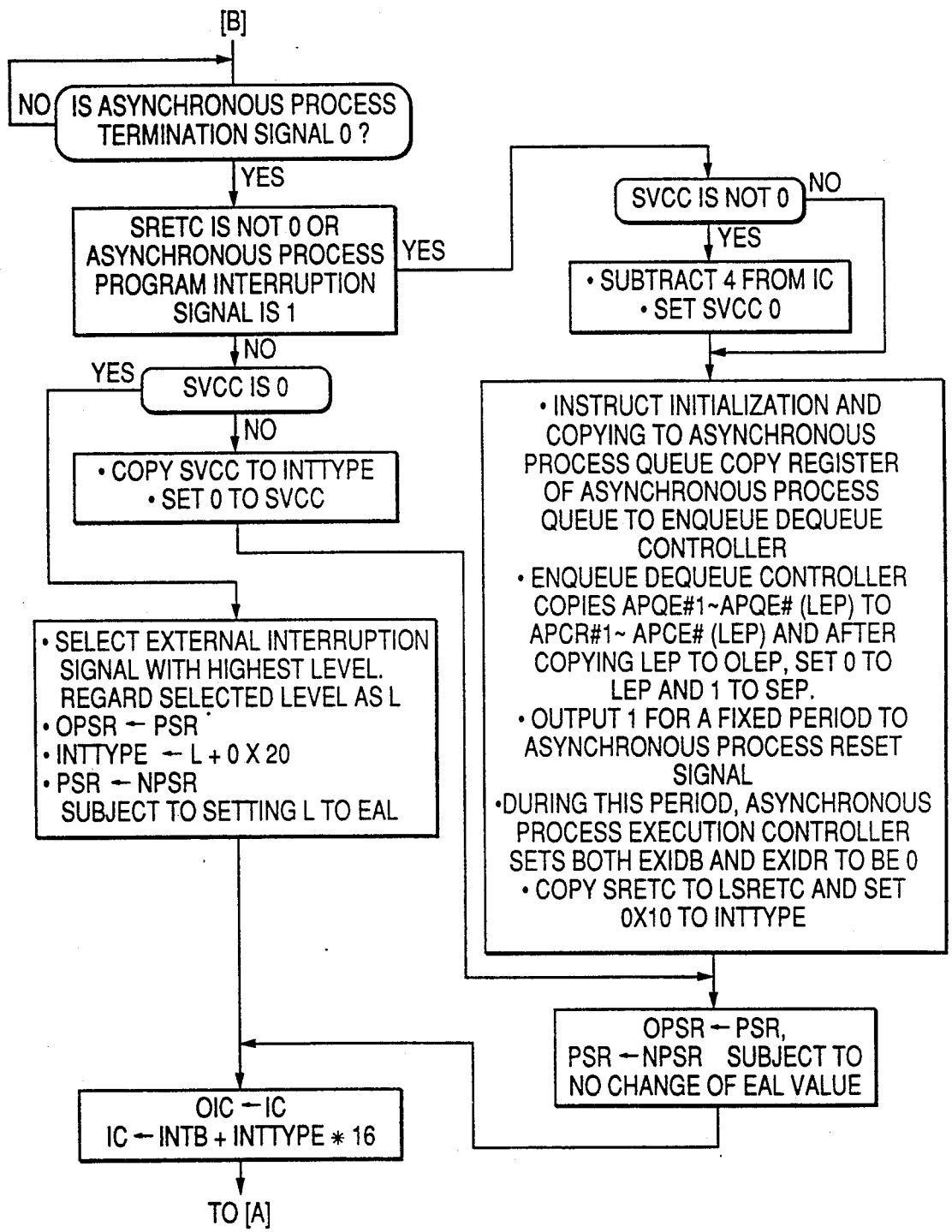

Next, as shown in FIG. 11B, in the [B] process, a determination is made as to whether or not the asynchronous process termination signal is a 0. If YES, a determination is made as to whether or not the SRETC is a 0 or whether or not the asynchronous process program interruption signal is a 1. If NO, a determination is made as to whether or not the SVCC is a 0. If NO, the SVCC is copied into the INTTYPE, a 0 is set in the SVCC and then OPSR←PSR and PSR←NPSR are performed (with the EAL value unchanged).

When the SVCC is a 0, the external interruption signal of the highest level is selected and the selected level is supposed to be L. After OPSR←PSR, INTTYPE←L+0×20, PSR←NPSR (with L set in the EAL), OIC←IC, IC←INTB+INTTYPE*16, a return is made to [A].

When the SRETC is not a 0, or when the asynchronous process program interruption signal is a 1 and the SVCC is not a 0, the IC is decremented by 4 and the SVCC is set to a 0.

The enqueue dequeue controller is prompted to copy the asynchronous process queue into the asynchronous process queue copy register and initialize it. The enqueue dequeue controller copies APQE#1 to APQE#(LEP) into APCR#1 to APCR(LEP). After the OLEP has been copied into the LEP, a 0 is set in the LEP and a 1 is set in the SEP. A 1 is output to the asynchronous process reset signal for a fixed period of time, during which period the asynchronous process execute controller sets the EXIDB and the EXIDR to 0. The SRECTC is copied into the LSRETC and 0×10 is set in the INTTYPE.

And, OPSR←PSR and PSR←NPSR are performed with the EAL value unchanged.

Figure 12:
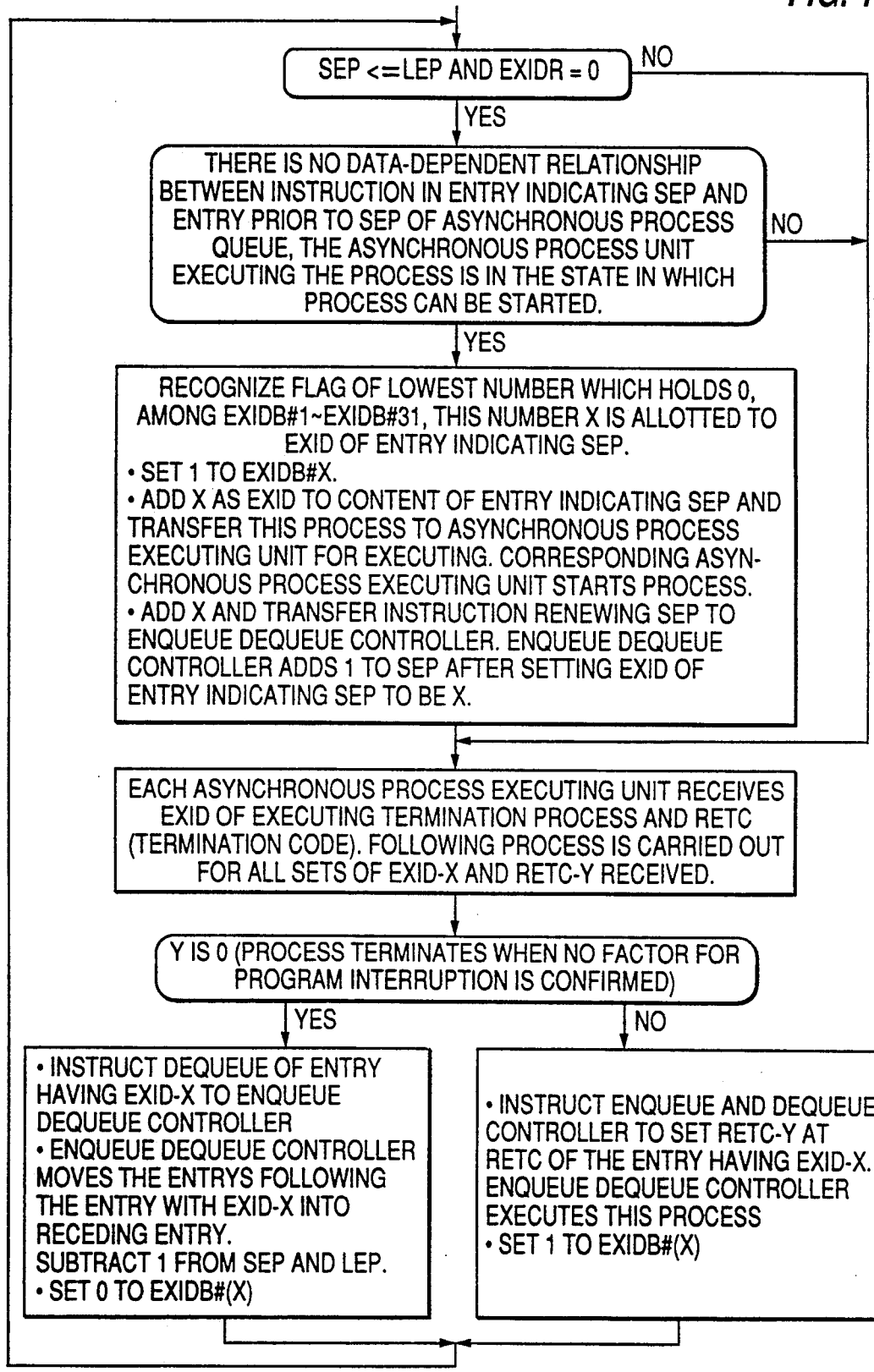
FIG. 12 is a flowchart illustrating the operation of the asynchronous process execution controller in the first embodiment.

Next, a description will be made of the operation of the asynchronous process execute controller with reference to FIG. 12.

When SEP< =LEP and EXID=0, a determination is made as to whether or not there is a data-dependent relationship between an instruction in the entry pointed to by the SEP and an asynchronous process queue entry prior to the SEP and the asynchronous processing unit for executing a corresponding process is placed in the state to initiate the process. If YES, of the EXIDB#1 to EXIDB#31 a flag which holds a 0 and is the lowest in number is recognized. The number X is allocated as the EXID of the entry pointed to by the SEP.

A 1 is set to the EXIDB#X.

X is added, as the EXID, to the contents of the entry pointed to by the SEP and transmitted to an asynchronous process execute unit which executes the process. The corresponding asynchronous process unit initiates the process.

X is added to prompt the enqueue dequeue controller to modify the SEP. After setting X to the EXID of the entry pointed to by the SEP, the enqueue dequeue controller adds a 1 to the SEP.

Next, the EXID and the RETC (termination code) of the execution terminate process that each asynchronous process execute unit transmits are accepted. The following processes are performed on accepted sets of EXID-X and RETC-Y.

When Y is a 0 (a program interruption factor is absent and the process is terminated), the enqueue dequeue controller is prompted to dequeue the entry having EXID-X. The enqueue dequeue controller shifts each of entries following the entry having EXID-X to the entry one entry before, The SEP and the LEP are decremented by one. A 0 is set to the EXIDB#(X).

When Y is not a 0, the enqueue dequeue controller is prompted to set RETC-Y to the RETC of the entry having EXID-X. The enqueue dequeue controller executes this process. A 1 is set to the EXIDR#(X).

Figure 13:
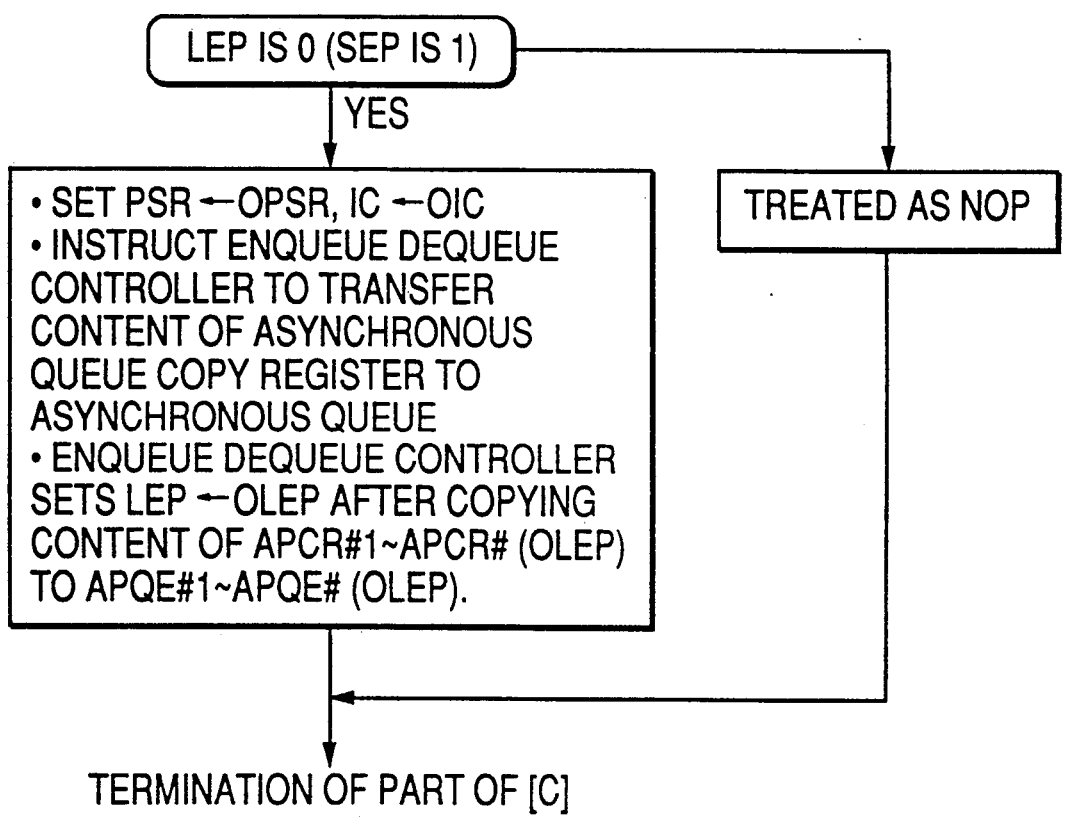
FIG. 13 is a flowchart of the processing of an RTN instruction in the first embodiment.

The process flow for the RTN instruction in [C] in the flow shown in FIG. 11A is shown in FIG. 13.

If LEP is 0 (SEP is 1), PSR←OPSR, IC←OIC are set and the enqueue dequeue controller is prompted to transfer the contents of the asynchronous queue copy register to the asynchronous process queue. After copying the contents of APCR#1 to APCR#(OLEP) to APQE#1 to APQE#(OLEP), the enqueue dequeue controller sets LEP−OLEP. The end of [C] is reached and when LEP is not 0, it is handled as NOP.

Next, a data-dependent relationship examining circuit used in the present invention will be described with reference to FIG. 14.

Figure 14:
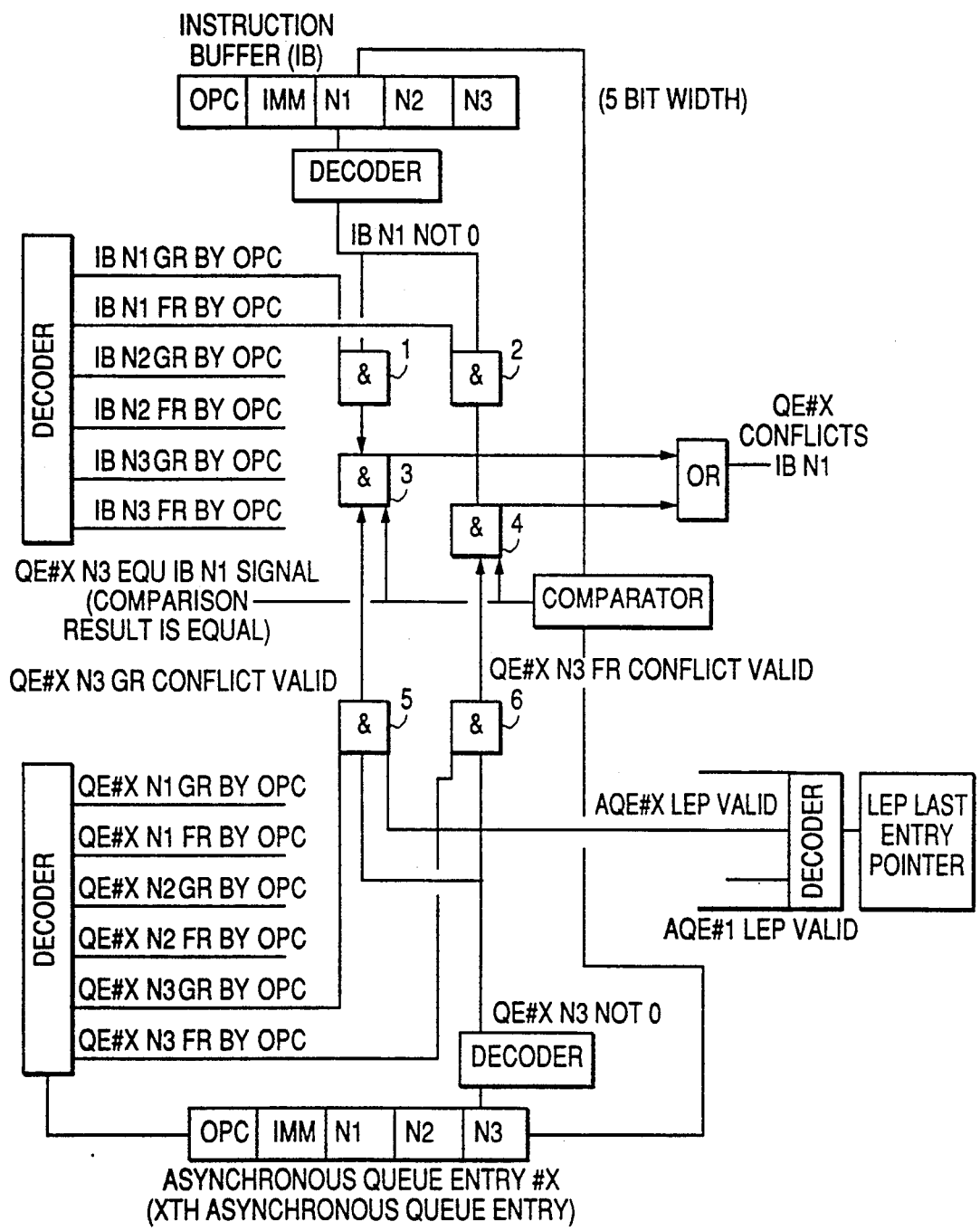
FIG. 14 is a block diagram illustrating hardware arrangement for detecting a data-dependent relationship.

In FIG. 14, by ORing QB#X conflicts IB N1 signals for all the asynchronous queue entries, the presence or absence of a data-dependent relationship for N1 areas in IB can be detected.

The same is true of N2 area in IB.

For N3 area in IB, a comparison is made with all N1, N2 and N3 areas of each queue entry.

The data-dependent relationship between entries pointed to by SEP(start entry pointer) may be detected by the following two methods.

(1) A method by which QE#X.(queue entry #X) is placed in the position of IB of FIG. 14 and a circuit for detecting a data-dependent relationship between QE#X and each of QE#X1 to QE#(X−1) is provided for each QE.

(2) An asynchronous process execute initiation buffer (APSB: Asynchronous process Start Buffer) is provided and the entry pointed to by SEP is copied into the APSB buffer. Such a data-dependent relationship detecting circuit is provided between the APSB buffer and each QE.

In FIG. 14, IB is replaced by APSB. Also, LEP and its decoder are replaced by SEP and its decoder, respectively.

Figure 7:
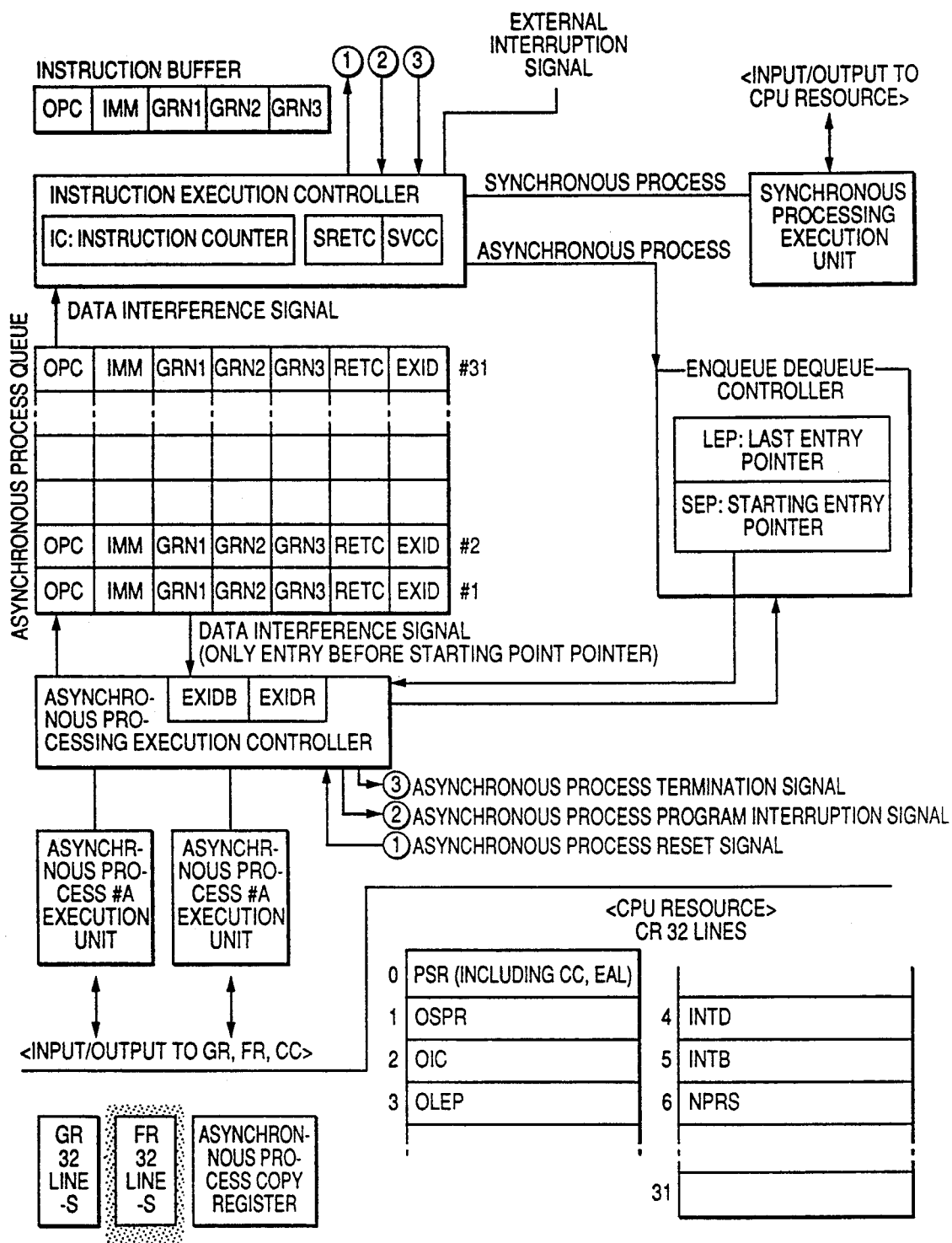
FIG. 7 is a block diagram representing hardware of a first embodiment of the present invention.

A dependent relationship between the instruction buffer of FIG. 7 and the #-th asynchronous queue entry of 32 asynchronous queue entries is examined. If a dependent relationship is present, QE#_Conflicts_IB_N1 is set to 1.

An instruction that enters the instruction buffer is the newest one and its dependent relationship with instructions that entered in the past is examined.

First, the OPC of the instruction buffer, that is, the type of instruction is examined by decoding. Instructions are classified into instructions specifying GR and instructions specifying FR. N1, N2, N3 indicated in the instruction buffer correspond to N1, N2, N3 of GR or N1, N2, N3 of FR. They are made clear by decoding OPC.

GR or FR is seen by the most significant bit of the OPC. It is GR when the most significant bit is 0, and it is FR when the most significant bit is 1.

A decoded output, for example, IB N1 GR by OPC, is a signal which becomes 1 when N1 is GR as a result of decoding of OPC. The same is true of N2, N3. Likewise, a determination can be made as to whether each field of N1, N2, N3 is Gr or FR by decoding the OPC of an instruction in an asynchronous queue entry. For example, QE#×N3 GR by OPC is a signal which goes to a 1 when the x-th asynchronous instruction in the asynchronous queue is N3 field GR and so on.

The N1 field in the instruction buffer 1B is decoded and 1B N1 NOT 0 goes to a 1 when all 0s are not detected. When the N1 area is 0, the specified instruction makes no conflicts (data-dependent relationship) with the queued instruction. When N1 is 0, there is no data-dependent relationship because the contents of GR0 or FRO specified by N1 are zero-fixed. Conversely, when 1B N1 NOT 0 is 1, there is the possibility of conflicts.

AND 1 outputs a 1 when the N1 area is GR and the N1 area is not 0.

Likewise, when the N1 area is GR and the N1 area is not 0, 1 becomes 1 at the output of AND 2.

The same is performed on N3.

AND 5 outputs a 1 when the N3 area is GR and the N3 area is not 0.

AND 6 outputs a 1 when the N3 area is FR and the N3 area is not 0.

But, each of the ANDs 5, 6 is supplied with AQE#X LEP valid, which is a signal which is obtained by decoding the last entry pointer LEP of the queue and goes to a 1 when the entry #X whose asynchronization process is not yet executed is before the last entry or does not yet produce the result of the execution.

The ANDs 3, 4 see whether N1 in the instruction buffer is GR, its contents are not 0, and the same GRN1 as it is the same GR indicated by N3 of queuing.

It is determined whether N1 of OPC is GR and the GR has become N3 of a queued instruction, that is, whether N3 of the GR instruction buffer receiving the results of an asynchronous queue process is the same as N3 of the asynchronous queue.

But, each of ANDs 5, 6 is supplied with AQE#X LEP valid, which is a signal which is obtained by decoding the last entry pointer of the queue and goes to a 1 when the #X-th entry whose asynchronous process has not been executed yet is before the last entry or has not yet produced the result of the execution.

The ANDs 3, 4 see whether N1 in the instruction buffer is FR, its contents are not 0, and the same GRN1 as it is the same FR indicated by N3 of queuing.

It is determined whether N1 of OPC is Gr and the GR has become N3 of a queued instruction, that is, whether N3 of the FR instruction buffer receiving the results of an asynchronous queue process is the same as N3 of the asynchronous queue.

By ORing the outputs of the ANDs 3 and 4, a signal indicating the presence or absence of the whole dependent relationship is produced. Each of the ANDs 3 and 4 produces a signal which goes to a 1 when a comparison in 5 bits between the contents of N3 of the asynchronous queue entry and the contents of N1 of the instruction buffer indicates equality. QE#IN3 eqn 113N1 is input as a condition. That is, there is a data-dependent relationship when N1 of GR specified is equal to N3 (N3 used as the result) of GR of the asynchronous queue.

The same is true of F1. When F1 of IB is equal to F3 of the queue, there is a data-dependent relationship.

Since the number of the instruction buffer is one and the number of the asynchronous queues is 32, the number of the circuits which are the same as that of FIG. 14 is 32.

Figure 15:
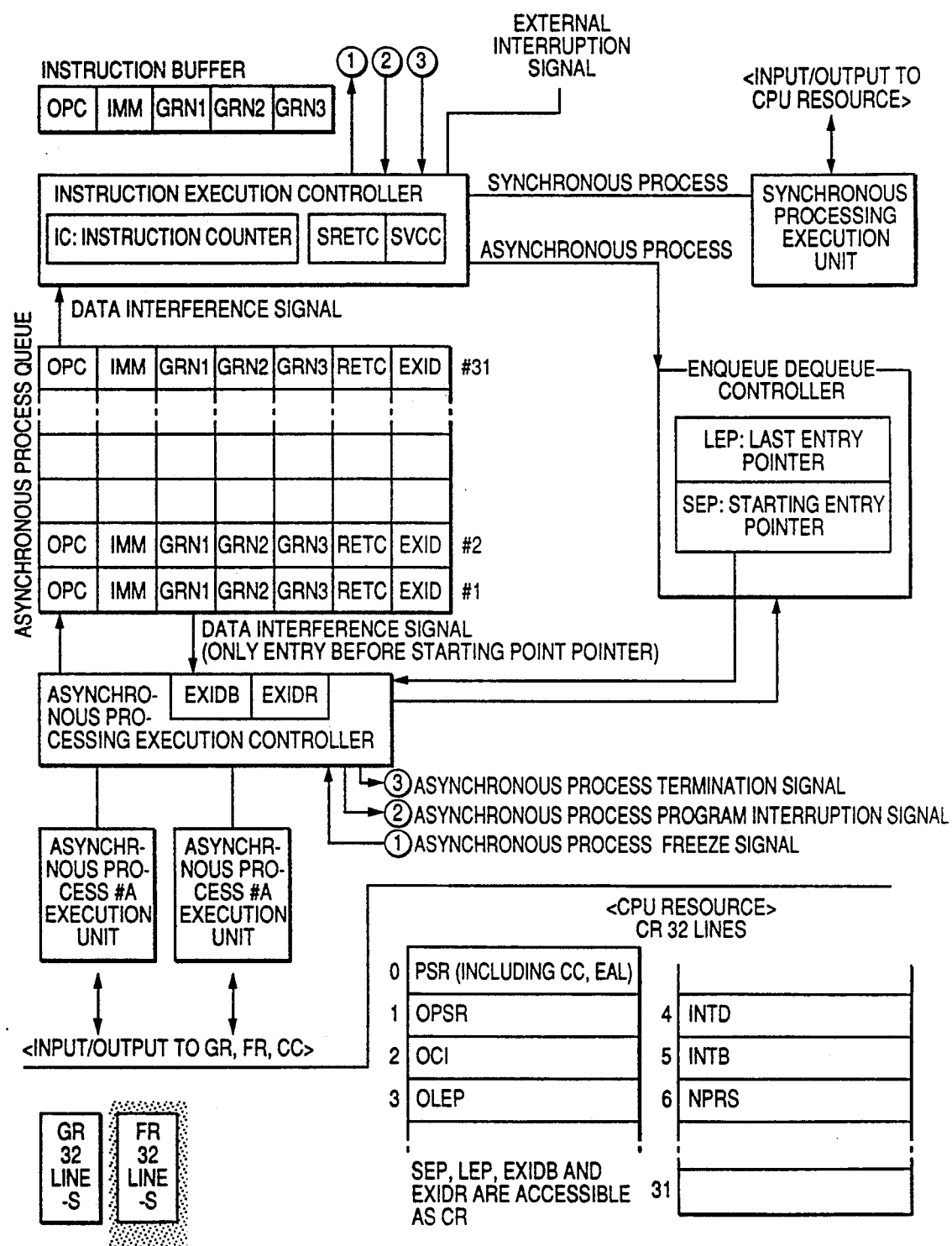
FIG. 15 is a block diagram representing hardware of a second embodiment of the present invention.

FIG. 15 illustrates a second embodiment of the present invention which is distinct from the first embodiment shown in FIG. 7 in that, instead of using the asynchronous process queue copy register, an asynchronous process freeze signal is applied to the asynchronous process queue to fix the contents of the asynchronous process queue. Further, the second embodiment is distinct from the first embodiment in that SEP, LEP, EX-IDB, EXIDR are made accessible as CR and an asynchronous process reset signal 1 is used as the asynchronous process freeze signal 1.

Figure 16:
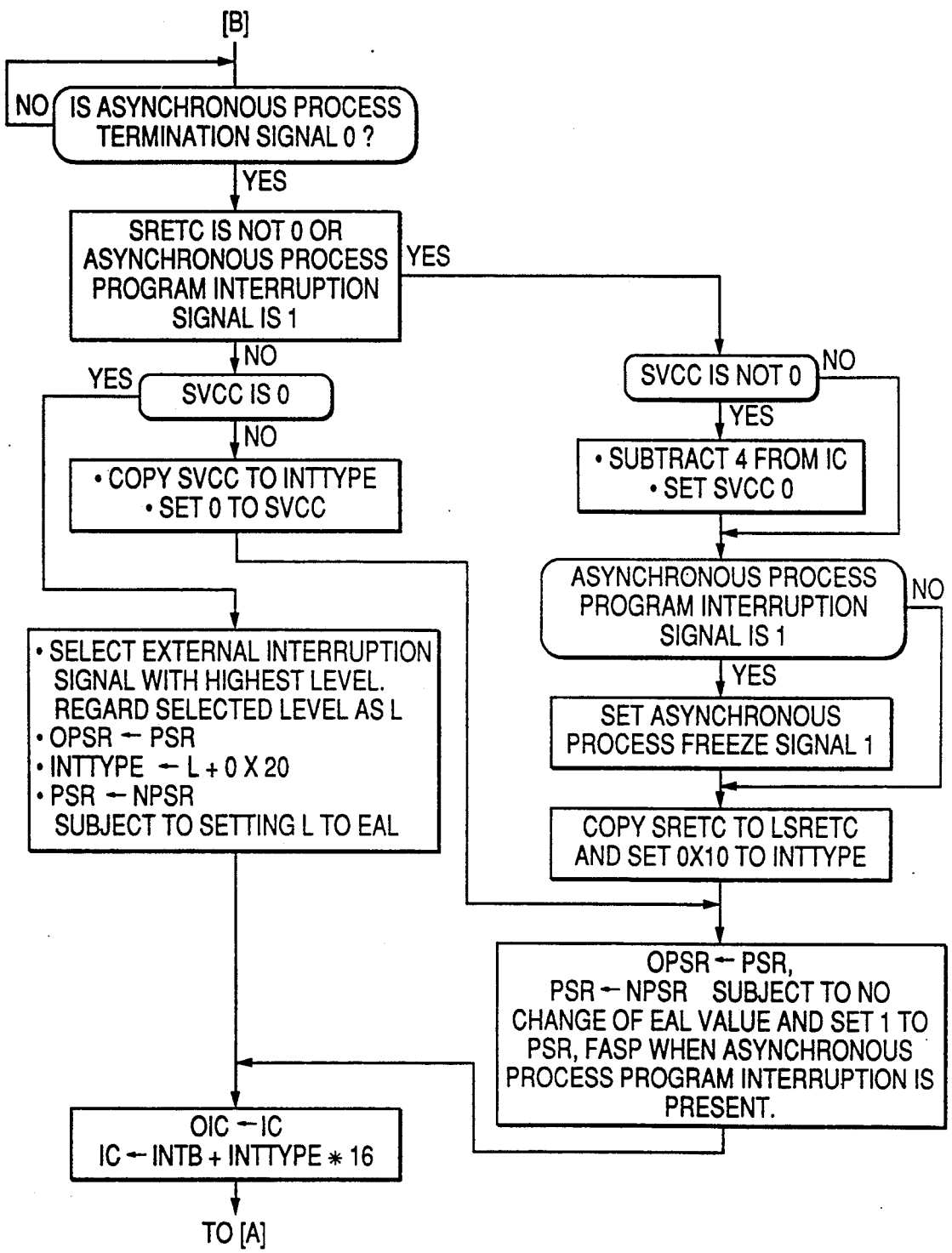
FIG. 16 is a flowchart for a part of an instruction execution controller in the second embodiment.

FIG. 16 is a flowchart of the operation of the instruction execute controller in the second embodiment which corresponds to the flowchart of the first embodiment shown in FIG. 11B.

First, following [B] of FIG. 11A, a determination is made as to whether the asynchronous process terminate signal is 0. When YES, a determination is made as to whether SRETC is 0 or whether the asynchronous process program interruption signal is 1. If NO, a determination is made as to whether SVCC is 0. When SVCC is not 0, SVCC is copied into INTTYPE, a 0 is set to SVCC, and OPRS←PSR, PSR←NPSR are set. In this case, the EAL value remains unchanged. In the presence of an asynchronous process program interruption, a 1 is set to PRS.

When SVCC is 0, an external interruption signal with the highest level is selected. Let the selected level be L. OPSR←PSR, INTTYPE←L+0×20, PSR←NPSR with L set to EAL. After OIC←IC, IC←INTB+INTTYPE*16, return is made to A.

When SVCC is not zero or the asynchronous process program interruption signal is one, if SVCC is not 0, IC is decremented by 4 and SVCC is set to zero.

Next, a determination is made as to whether or not the asynchronous process program interruption signal is one. When YES, the asynchronous process freeze signal is set to one and SRETC is copied into LSRETC. 0×10 is set in INTTYPE and OPSR+PSR, PSR←NPSR. The EAL value remains unchanged and, in the presence of an asynchronous process program interruption, one is set in PRS. When the asynchronous process program interruption signal is not one, SRETC is copied into LSRETC without making the asynchronous process freeze signal one.

Figure 17:
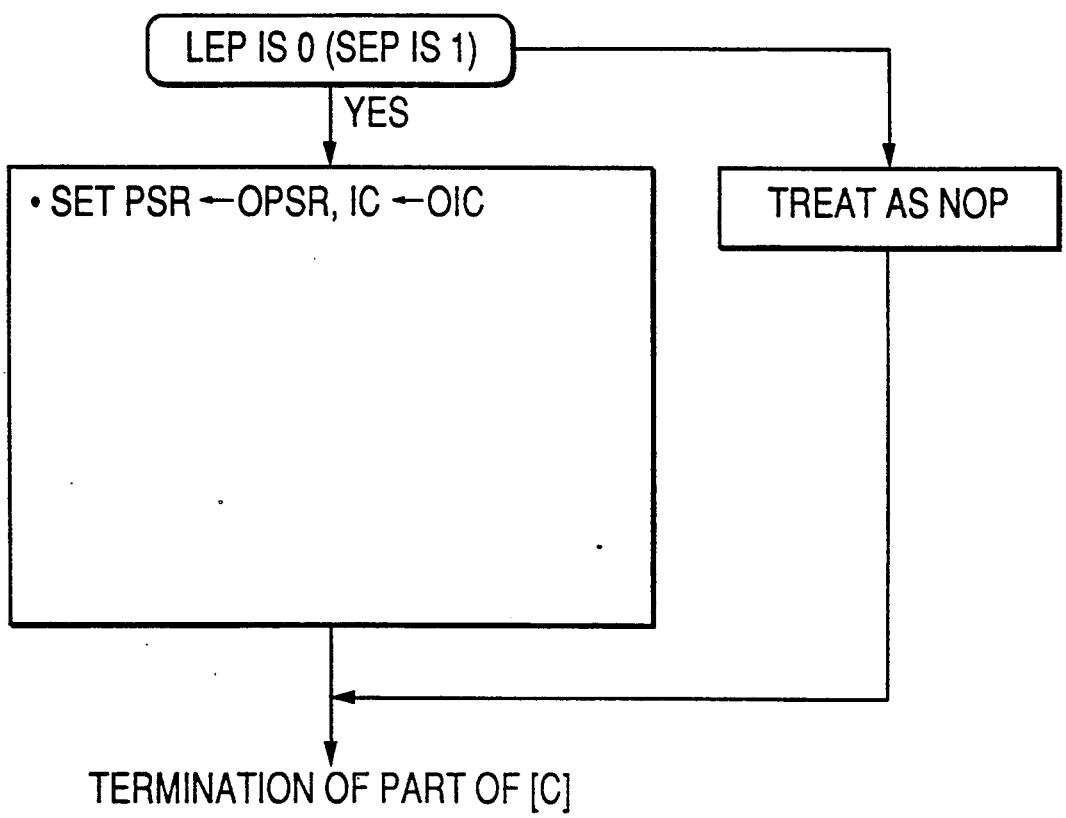
FIG. 17 is a flowchart illustrating the processing of an RTN instruction in the second embodiment.

FIG. 17 illustrates a flowchart of the RTN instruction shown in [C] of FIG. 11A in accordance with the second embodiment, which corresponds to FIG. 13 of the first embodiment.

When LEP is zero (SEP is one). PSR←OPSR, IC←OIC and LEP is handled as NOP when it is not zero. [C] comes to an end.

INDUSTRIAL APPLICABILITY

As described above, according to the present invention, there is provided an interruption handling system which can speed up asynchronous CPU resource using processes, execute basic CPU resource using processes used by an interruption handler asynchronously and produce the interruption handler easily. Further, asynchronous execution of basic asynchronous CPU resource using processes used by the interruption handler is possible and for a necessary CPU resource using process dependent factor, an interruption system for permitting an original program to be resumed becomes possible after termination of a corresponding process by the interruption handler.

What is claimed is:

1. An interruption handling system for an instruction processed by a synchronous processing unit and an asynchronous processing unit, comprising:
   an instruction buffer to store the instruction;
   queuing means for determining for the instruction stored in said instruction buffer which of a synchronous process and an asynchronous process is indicated and for queuing the instruction when an asynchronous process is indicated; and
   displaying means for displaying, when more than one queued asynchronous process is terminated under exceptional circumstances including — without beginning processing, with exception in a case where an interruption is generated in one of the synchronous processing unit and the asynchronous processing unit and by an external interruption, contents and termination methods of all of the queued asynchronous processes terminated under the exceptional circumstances to enable resumption of each queued asynchronous process.

2. An interruption handling system according to claim 1, wherein said displaying means includes means for saving all queued asynchronous processes in a register different from said queuing means.

3. An interruption handling system according to claim 1, wherein said displaying means includes means for freezing the more than one queued asynchronous process in said queuing means.

4. An interruption handling system for processing instructions held in an buffer and executed by one of a synchronous processing unit and an asynchronous processing unit depending upon an indication in each instruction, said interrupting handling system comprising:

queuing means for determining for an instruction stored in the instruction buffer which of a synchronous process and an asynchronous process is indicated and for queuing the instruction when an asynchronous process is indicated;

displaying means for displaying, when more than one queued asynchronous process is terminated under exceptional circumstances including — without beginning processing, with exception in a case where an interruption is generated in one of the synchronous processing unit and the asynchronous processing unit and by an external interruption, contents and termination methods of all of the queued asynchronous processes terminated under the exceptional circumstances to enable resumption of each queued asynchronous process; and means for executing control procedures for resuming the more than one queued asynchronous process terminated under the exceptional circumstances.

5. An interruption handling system for instructions executed by one of a synchronous processing unit and an asynchronous processing unit, each instruction held in an instruction buffer while executing and including at least one field for register designation and an indication of one of synchronous and asynchronous processing, said interruption handling system comprising:

queuing means for determining for an instruction stored in the instruction buffer which of a synchronous process and an asynchronous process is indicated and for queuing the instruction in an asynchronous queue when an asynchronous process is indicated;

data-dependent relationship checking means for detecting a data-dependent relationship by checking whether a queued instruction and the instruction in the instruction buffer both designate an identical register; and processing means for checking a data-dependent relationship between a first process in the asynchronous queue and a second process following the first process in the asynchronous queue and for executing the first and second processes while keeping the data-dependent relationship therebetween; and displaying means for displaying, when more than one queued asynchronous process is terminated under exceptional circumstances including — without beginning processing, with exception in a case where an interruption is generated in one of the synchronous processing unit and the asynchronous processing unit and by an external interruption, contents and termination methods of all of the queued asynchronous processes terminated under the exceptional circumstances to enable resumption of each queued asynchronous process.

6. An interruption handling system for instructions executed by one of a synchronous processing unit and an asynchronous processing unit, each instruction held in an instruction buffer while executing and including at least one field for register designation and an indication of one of synchronous and asynchronous processing, said interruption handling system comprising:

queuing means for determining for an instruction stored in the instruction buffer which of a synchronous process and an asynchronous process is indicated and for queuing the instruction in an asynchronous queue when an asynchronous process is indicated;

data-dependent relationship checking means for detecting a data-dependent relationship by checking whether a queued instruction and the instruction in the instruction buffer both designate an identical register;

processing means for checking a data-dependent relationship between a first process in the asynchronous queue and a second process following the first process in the asynchronous queue and for executing the first and second processes while keeping the data-dependent relationship therebetween;

displaying means, when more than one queued asynchronous process is terminated under exceptional circumstances including — without beginning processing, with exception in a case where an interruption is generated in one of the synchronous processing unit and the asynchronous processing unit and by an external interruption, contents and termination methods of all of the queued asynchronous processes terminated under the exceptional circumstances to enable resumption of each queued asynchronous process; and means for executing control procedures for resuming the more than one queued asynchronous process terminated under the exceptional circumstances.

7. An interrupting handling system in a data processing system having a program counter, for handling processes performing at least one of inputting from CPU resources including registers and outputting from the CPU resources, the processes classified into synchronous CPU resource using processes and asynchronous CPU resource using processes, said interrupt handling system comprising:

synchronous instruction/asynchronous instruction processing means for initiating a synchronous CPU resource using process designated by a synchronous instruction, executing the synchronous resource using process synchronously with execution of the synchronous instruction and terminating the synchronous CPU resource using process initiated by the synchronous instruction upon termination of the execution of the synchronous instruction and for initiating an asynchronous CPU resource using process designated by an asynchronous instruction, executing the asynchronous resource using process asynchronously with execution of the asynchronous instruction and terminating the asynchronous CPU resource using process initiated by the asynchronous instruction after termination of the execution of the asynchronous instruction;

data-dependent relationship processing means for detecting a CPU resource using process dependent interruption factor indicating
- when a first asynchronous CPU resource using process for performing an outputting operation to a first resource has been initiated by a first instruction to store an output in the first resource and the first resource is used for input by a succeeding process initiated by a second instruction issued after the first instruction, thereby forming a data-dependent relationship therebetween, input from the first resource to the succeeding process is to wait until the output is stored in the first resource by the first asynchronous process,
- output by the succeeding process to a second resource, is to wait until after access to the first resource by all CPU resource using processes initiated prior to the succeeding process,
- when the succeeding process is one of the synchronous CPU resource using processes, termination of the second instruction is to wait until the program counter remains pointing to the second instruction,
- when the succeeding process is a second asynchronous CPU resource using process, termination of execution of the second instruction is permitted to be delayed until access to the first resource by the first asynchronous CPU using process is terminated even though execution of the second instruction is completed and the succeeding process is initiated, and
- when execution of the first asynchronous CPU resource using process is initiated, output to a second resource used by the succeeding process is to wait until input to the first asynchronous CPU resource using process is terminated;

state waiting means for controlling interruption operations, when one of the CPU resource using process dependent interruption factor is detected in a currently executing CPU resource using process and an interruption is generated without directly depending on a result of the currently executing CPU resource using process, the interruption operations including not initiating execution of a new instruction and continuing execution of the first instruction and the first asynchronous CPU resource using process until the first asynchronous CPU resource using process terminates;

asynchronous CPU resource using process terminating means for terminating, after termination of the first asynchronous CPU resource using process, all asynchronous CPU resource using processes executing at initiation of the interruption operation; and synchronous CPU resource using process terminating means for terminating synchronous CPU resource using processes upon instruction termination and for terminating all synchronous CPU resource using processes executing when the first instruction terminates.

8. An interruption handling system according to claim 7, further comprising CPU resource using process dependent interruption control means for changing a result of the succeeding process from an expected result when said data-dependent relationship processing means detects the CPU resource using process dependent interruption factor for the first asynchronous CPU resource using process and the succeeding process.

9. An interruption handling system according to claim 8, wherein said data-dependent relationship processing means detects the CPU resource using process dependent interruption factor when a specific event is generated during execution of the first asynchronous CPU resource using process to produce the expected result.

10. An interruption handling system according to claim 7, wherein said asynchronous CPU resource using process terminating means completes the first asynchronous CPU resource using process to produce an expected output.

11. An interruption handling system according to claim 7, wherein said asynchronous CPU resource using process terminating means responds to the CPU resource using process dependent interruption factor detected by said data-dependent relationship processing means by terminating execution of all succeeding processes.

12. An interruption handling system according to claim 7, wherein said asynchronous CPU resource using process terminating means terminates the second asynchronous CPU resource using process when during processing of the first asynchronous CPU resource using process the CPU resource using process dependent interruption factor, is detected and an unexpected output is produced and erases the data-dependent relationship for the output of the first asynchronous CPU resource using process.

13. An interruption handling system according to claim 12, wherein said asynchronous CPU resource using process terminating means terminates a third asynchronous CPU resource using process using an output of the second asynchronous CPU resource using process as an input and erases the data-dependent relationship for the output of the second asynchronous CPU resource using process.

14. An interruption handling system according to claim 7, wherein, when at least one asynchronous CPU resource using process dependent interruption factor is detected, said asynchronous CPU resource using process terminating means terminates a third asynchronous CPU resource using process already initiated but unexpected and having no data-dependent relationship indicated by the CPU resource using process dependent interruption factor.

15. An interruption handling system according to claim 7, wherein said synchronous CPU resource using process terminating means completes the synchronous CPU resource using process when the CPU resource using process dependent interruption factor is not detected.

16. An interruption handling system according to claim 7, wherein said synchronous CPU resource using process terminating means terminates execution of the synchronous CPU resource using process upon detection of the CPU resource using process dependent interruption factor.

17. An interruption handling system according to claim 7, further comprising:
- interruption generating means for initiating an interruption operation corresponding to a CPU resource using process independent interruption factor without detection of any CPU resource using process dependent interruption factor;

interruption informing means for simultaneously informing, when at least one CPU resource using process dependent factor is detected, all asynchronous CPU resource using processes and synchronous CPU resource using processes to release all CPU resources after interruption is ensured.

18. an interruption handling system according to claim 7, further comprising:

resume-expected CPU resource using process interruption means for re-executing, when processes generate resume-expected CPU resource using process dependent interruptions and CPU resource using processes terminate unexecuted with the CPU resource using process dependent factor, a designated process causing detection of a designated resume-expected CPU resource using process dependent interruption factor and each process terminated unexecuted after returning to an interruption-originated program;

display means for displaying under control of an interruption factor processing program information to simulate processing a program at time of interruption; and resumption-expected CPU resources using process interruption means for terminating each initiated process having an input resource corresponding to an output resource of the designated process upon interruption.

19. The interruption handling system according to claim 18, wherein CPU resource using process dependent interruption factors include a resume-expected CPU resource using process dependent interruption factor indicating a resumable program to be re-executed by said resume-expected CPU resource using process interruption means after executing an appropriate process by said resumption-expected CPU resources using process interruption means.

20. A method of operating a command processor having a program counter and enabling resumption of a program generating an interruption factor when a resume-expected CPU resource using process dependent interruption factor is generated, said method comprising the steps of:

(a) classifying processes producing outputs to and using inputs from CPU resources, including registers, into synchronous CPU resource using processes initiated by a first command for invoking a first process to be executed synchronously with execution of the first command, and to be completed when execution of the first command is completed, and asynchronous CPU resource using processes initiated by a second command designating a second process executed asynchronously with execution of the second command, and continuing execution after execution of the second command is completed;

(b) preventing input from a CPU resource in a succeeding process until completion of an output to the CPU resource by a preceding process, initiated as one of the asynchronous CPU resource using processes prior to the succeeding process;

(c) preventing completion of execution of a succeeding command designating the succeeding process until access to any commonly used resources are completed by the preceding process, ad when the succeeding process is one of the synchronous CPU resource using processes, until the program counter remains designating the succeeding command and when the succeeding process is one of the asynchronous CPU resource using processes, completion of execution of the succeeding command is permitted to be delayed until completion of all accesses to the commonly used resources by the preceding process;

(d) detecting a CPU resource using process dependent interruption factor in two of the synchronous and asynchronous CPU resource using processes when a predetermined event occurs during execution of one of the synchronous and asynchronous CPU resource using processes, the CPU resource using process dependent interruption factor indicating that an output of the preceding process for which the CPU resource using process dependent interruption factor is detected has a first expected result, but when an interruption occurs use of the output as an input in the succeeding process will not produce a second expected result;

(e) producing a different result of executing the succeeding process, different from the second expected result, when the output from the preceding process for which the CPU resource using process dependent interruption factor is detected;

(f) performing interruption processing in hardware when the CPU resource using process dependent interruption factor is detected during execution of one of the synchronous and asynchronous CPU resource using processes and when a CPU resource using process independent interruption occurs independent of any result obtained from executing any CPU resource using process is detected, including the steps of (f1) preventing execution of a new command, (f2) continuing execution of a currently executing command and executable asynchronous CPU resource using processes already initiated, (f3) waiting for completion of all executable asynchronous CPU resource using processes, (f4) terminating, after said waiting for completion in step (f3), all the executable asynchronous CPU resource using processes still executing, by one of the subsubsteps of (f4A) completing execution of one of the asynchronous CPU resource using processes, when the CPU resource using process dependent interruption factor is not detected, using an expected output thereof, (f4B) terminating execution of one of the asynchronous CPU resource using processes for which the CPU resource using process dependent interruption factor is detected, (f4C) terminating, without execution and with removal of all data dependency relationships, all uninitiated asynchronous CPU resource using processes inputting from any CPU resource output to by the preceding process when the preceding process does not produce the first expected result by detecting the CPU resource using process dependent interruption factor, (f4D) terminating, without being executed, any unrelated asynchronous CPU resource using processes when at least one CPU resource using process dependent interruption factor is detected, even though the unrelated asynchronous CPU resource using processes have no data dependency with the CPU resource using process dependent interruption factor, (f4E) terminating executing synchronous CPU resource using processes when execution of one of the synchronous CPU resource using processes is interrupted and when said waiting in step (f3) is completed, after completion of each synchronous CPU resource using process for which the CPU resource using process dependent interruption factor is not detected and before completion of each of the synchronous CPU resource using processes for which the CPU resource using process dependent interruption factor is not detected, (f5) interrupting all executing processes when no CPU resource using process dependent interruption factor has been detected, (f6) notifying, when at least one CPU resource using process dependent interruption factor has been detected, all pieces of information on asynchronous and synchronous CPU resource using processes when an interruption occurs; and (g) resuming an interruption generating program after executing an appropriate interruption processing program when the interruption generating program has a resume-expected CPU resource using process dependent interruption factor, after all other programs having resume-expected CPU resource using process dependent interruption factors are processed appropriately, by performing the substeps of (g1) detecting a designated resume-expected CPU resource using process dependent interruption, (g2) re-executing any process terminated without ever being executed, and (g3) executing an interruption factor processing program to display information for simulating; and (h) preserving, during interruption, input data for the succeeding process having the CPU resource using process dependent interruption factor.

21. An interruption processing system for processing interruptions in a central processing unit having resources including a register comprising:

means for executing synchronous CPU resource using processes, each initiated by a first command, using the resources of the central processing unit including the register and executed synchronously with execution of the first command and asynchronous CPU resource using processes, each initiated by a second command, using the resources of the central processing unit and executed asynchronously with execution of the command;

preserving means for preserving a data dependency relation between one of the asynchronous CPU resource using processes and another CPU resource using process;

means for processing an interruption, generated during execution of one of the synchronous and asynchronous CPU resource using processes, for one of an interruption factor dependent on one of the resources of the central processing unit and an interruption factor independent of the resources of the central processing unit;

means for detecting any interruption factor upon terminating a command invoking one of the synchronous and asynchronous CPU resource using processes being executed by the central processing unit;

means for restraining start of a next command while waiting for termination of all asynchronous CPU resource using processes already initiated for current execution;

storing means for storing a terminating condition for each executing asynchronous CPU resource using process;

means for generating an interruption factor dependent on one of the asynchronous CPU resource using processes when execution of all executing asynchronous CPU resource using processes are terminated; and means for restoring a hardware state of the central processing unit based on the terminating condition stored in said storing means when the interruption is terminated.

* * * * *

UNITED STATES PATENT AND TRADEMARK OFFICE
CERTIFICATE OF CORRECTION

PATENT NO. : 5,301,331
DATED : April 5, 1994
INVENTOR(S) : Haruhiko Ueno et al.

It is certified that error appears in the above-indentified patent and that said Letters Patent is hereby corrected as shown below:

On title page, item [57] Abstract, lines 5-6, delete in its entirety "interruption handler to be executed asynchronously"

Col. 4, line 21, after "resource" insert -----.

Col. 5, end of line 28, delete the "," and substitute a --.--.

Col. 8, line 60, after "FIG. 1" insert --,--.

line 67, after "Ef1" delete the "." and substitute a --,--.

Col. 10, line 28, delete "FIG." and substitute --FIGS.--.

Col. 13, line 47, after "point" insert --are part of the asynchronous process queue--.

Col. 17, end of line 17, delete the "-".

UNITED STATES PATENT AND TRADEMARK OFFICE
CERTIFICATE OF CORRECTION

PATENT NO. : 5,301,331
DATED : April 5, 1994
INVENTOR(S) : Haruhiko Ueno et al.

It is certified that error appears in the above-indentified patent and that said Letters Patent is hereby corrected as shown below:

Column 25, line 65, delete "ad" and substitute --and--.

Signed and Sealed this

Eighteenth Day of October, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,301,331
DATED : April 5, 1994
INVENTOR(S) : Ueno et al.

It is certified that error appears in the above-indentified patent and that said Letters Patent is hereby corrected as shown below:

On the title page, insert the following information:

-- [30], "Foreign Application Prior Data"
March 19, 1990 [JP] Japan.............2-69158--.

Signed and Sealed this

Twenty-first Day of March, 1995

Attest:

BRUCE LEHMAN

Attesting Officer      *Commissioner of Patents and Trademarks*